United States Patent
Walsh et al.

(10) Patent No.: US 9,813,307 B2
(45) Date of Patent: Nov. 7, 2017

(54) METHODS AND SYSTEMS OF MONITORING FAILURES IN A DISTRIBUTED NETWORK SYSTEM

(71) Applicant: Rackspace US, Inc., San Antonio, TX (US)

(72) Inventors: Alexander Leonard Walsh, Waverly (CA); Daniel Joseph Spraggins, Garden Ridge, TX (US)

(73) Assignee: Rackspace US, Inc., San Antonio, TX (US)

( * ) Notice: Subject to any disclaimer, the term of this patent is extended or adjusted under 35 U.S.C. 154(b) by 127 days.

(21) Appl. No.: 13/841,446

(22) Filed: Mar. 15, 2013

(65) Prior Publication Data

US 2014/0215057 A1    Jul. 31, 2014

Related U.S. Application Data

(63) Continuation-in-part of application No. 13/752,147, filed on Jan. 28, 2013, now Pat. No. 9,135,145, and a continuation-in-part of application No. 13/752,255, filed on Jan. 28, 2013, now Pat. No. 9,521,004, and a continuation-in-part of application No. 13/752,234, filed on Jan. 28, 2013, now Pat. No. 9,658,941.

(51) Int. Cl.
*G06F 9/44* (2006.01)
*H04L 12/24* (2006.01)
*H04L 29/08* (2006.01)

(52) U.S. Cl.
CPC ........ *H04L 41/5009* (2013.01); *H04L 67/025* (2013.01)

(58) Field of Classification Search
USPC ................. 717/128, 127, 130, 131
See application file for complete search history.

(56) References Cited

U.S. PATENT DOCUMENTS

| | | | |
|---|---|---|---|
| 5,742,803 A | 4/1998 | Igarashi et al. |
| 6,026,362 A | 2/2000 | Kim et al. |
| 6,115,462 A | 9/2000 | Servi et al. |

(Continued)

FOREIGN PATENT DOCUMENTS

| | | |
|---|---|---|
| CN | 103036974 A | 12/2012 |
| WO | 2013/119841 A1 | 8/2013 |

OTHER PUBLICATIONS

Salesforce-API Request-2008, located at https://developer.salesforce.com/forums/?id=906F00000008jcXIAQ 2008.*

(Continued)

*Primary Examiner* — Wei Zhen
*Assistant Examiner* — Hossain Morshed
(74) *Attorney, Agent, or Firm* — Dykema Gossett P.L.L.C.

(57) ABSTRACT

In one embodiment, the methods and systems may include receiving an Application Program Interface (API) request, assigning a unique identifier to the API request, recording, in association with the unique identifier, receipt time corresponding to a time at which the API request is received, and associating one or more system state changes with the unique identifier. Advantageously, the present embodiments provide a more accurate failure monitoring and associated metrics. Additional benefits and advantages of the present embodiments will become evident in the following description.

20 Claims, 12 Drawing Sheets

(56) References Cited

U.S. PATENT DOCUMENTS

| | | | |
|---|---|---|---|
| 6,148,323 A * | 11/2000 | Whitner | G06F 11/28 714/E11.178 |
| 6,230,312 B1 | 5/2001 | Hunt | |
| 6,351,843 B1 | 2/2002 | Berkley et al. | |
| 6,381,735 B1 | 4/2002 | Hunt | |
| 6,499,137 B1 | 12/2002 | Hunt | |
| 6,546,553 B1 | 4/2003 | Hunt | |
| 6,629,123 B1 | 9/2003 | Hunt | |
| 6,633,910 B1 | 10/2003 | Rajan et al. | |
| 6,718,414 B1 | 4/2004 | Doggett | |
| 6,965,861 B1 | 11/2005 | Dailey et al. | |
| 6,996,808 B1 | 2/2006 | Niewiadomski et al. | |
| 7,089,583 B2 | 8/2006 | Mehra et al. | |
| 7,263,689 B1 | 8/2007 | Edwards et al. | |
| 7,321,844 B1 * | 1/2008 | Holley | H04L 43/0805 702/179 |
| 7,353,507 B2 | 4/2008 | Gazdik et al. | |
| 7,356,443 B2 * | 4/2008 | Barford | H04L 41/06 370/232 |
| 7,454,486 B2 | 11/2008 | Kaler et al. | |
| 7,523,465 B2 | 4/2009 | Aamodt et al. | |
| 7,539,907 B1 * | 5/2009 | Johnsen | G06F 11/008 714/26 |
| 7,571,478 B2 | 8/2009 | Munson et al. | |
| 7,840,618 B2 | 11/2010 | Zhang et al. | |
| 8,135,847 B2 | 3/2012 | Pujol et al. | |
| 8,280,683 B2 | 10/2012 | Finkler | |
| 8,327,178 B2 * | 12/2012 | Vandwalle | H04W 8/005 709/223 |
| 8,352,431 B1 | 1/2013 | Protopopov et al. | |
| 8,495,197 B1 * | 7/2013 | Nagargadde | G06F 9/5011 709/219 |
| 8,589,893 B1 | 11/2013 | Allen | |
| 8,595,709 B2 | 11/2013 | Rao et al. | |
| 8,612,599 B2 * | 12/2013 | Tung | G06F 11/3495 709/224 |
| 8,689,172 B2 | 4/2014 | Amaral et al. | |
| 8,805,971 B1 | 8/2014 | Roth | |
| 8,819,701 B2 | 8/2014 | Wheeler et al. | |
| 8,856,319 B1 | 10/2014 | Huang et al. | |
| 8,988,983 B1 * | 3/2015 | Brandwine | H04L 69/40 370/218 |
| 2002/0007468 A1 * | 1/2002 | Kampe | H04L 41/0659 714/4.12 |
| 2003/0084158 A1 | 5/2003 | Saito et al. | |
| 2004/0078464 A1 | 4/2004 | Rajan et al. | |
| 2004/0139194 A1 * | 7/2004 | Naganathan | H04L 41/046 709/224 |
| 2004/0230636 A1 * | 11/2004 | Masuoka | G06F 9/4443 708/800 |
| 2006/0158354 A1 | 7/2006 | Aberg et al. | |
| 2007/0027974 A1 * | 2/2007 | Lee | H04L 41/0681 709/223 |
| 2007/0112578 A1 * | 5/2007 | Randle | H04L 63/0272 713/156 |
| 2007/0283331 A1 | 12/2007 | Pietrek | |
| 2008/0052387 A1 * | 2/2008 | Heinz | H04L 41/5025 709/223 |
| 2008/0168446 A1 * | 7/2008 | Shen | G06F 9/466 718/101 |
| 2008/0232358 A1 | 9/2008 | Baker et al. | |
| 2009/0077543 A1 | 3/2009 | Siskind et al. | |
| 2009/0177507 A1 * | 7/2009 | Breitgand | G06Q 10/0639 705/7.38 |
| 2009/0192847 A1 | 7/2009 | Lipkin et al. | |
| 2009/0276771 A1 * | 11/2009 | Nickolov | G06F 9/4856 717/177 |
| 2010/0082513 A1 | 4/2010 | Liu | |
| 2010/0125745 A1 * | 5/2010 | Kogan | G06F 11/008 714/1 |
| 2010/0174813 A1 | 7/2010 | Hildreth et al. | |
| 2010/0319004 A1 * | 12/2010 | Hudson | G06F 9/5072 719/313 |
| 2011/0071988 A1 * | 3/2011 | Resch | G06F 11/1076 707/691 |
| 2011/0099146 A1 * | 4/2011 | McAlister | G06F 11/3006 707/634 |
| 2011/0099420 A1 * | 4/2011 | MacDonald McAlister | G06F 11/2025 714/6.32 |
| 2011/0225293 A1 * | 9/2011 | Rathod | G06F 17/30867 709/224 |
| 2011/0239194 A1 | 9/2011 | Braude | |
| 2011/0251937 A1 | 10/2011 | Falk et al. | |
| 2011/0252071 A1 | 10/2011 | Cidon | |
| 2011/0283266 A1 | 11/2011 | Gallagher et al. | |
| 2011/0289440 A1 | 11/2011 | Carter et al. | |
| 2012/0011153 A1 | 1/2012 | Buchanan et al. | |
| 2012/0102471 A1 | 4/2012 | Artzi et al. | |
| 2012/0102572 A1 * | 4/2012 | Murakami | G06F 9/5061 726/28 |
| 2012/0158590 A1 | 6/2012 | Salonen | |
| 2012/0166869 A1 * | 6/2012 | Young | G06F 11/008 714/15 |
| 2012/0167057 A1 | 6/2012 | Schmich et al. | |
| 2012/0204187 A1 * | 8/2012 | Breiter | G06F 9/5072 718/105 |
| 2012/0254284 A1 * | 10/2012 | Tamura | G06F 11/3089 709/202 |
| 2012/0254417 A1 * | 10/2012 | Luna | H04L 67/2828 709/224 |
| 2012/0260134 A1 * | 10/2012 | Doddavula | G06F 11/008 714/38.1 |
| 2012/0284314 A1 | 11/2012 | Nagpal et al. | |
| 2012/0317274 A1 | 12/2012 | Richter et al. | |
| 2013/0042316 A1 * | 2/2013 | Lappetelainen | H04W 48/18 726/10 |
| 2013/0103837 A1 | 4/2013 | Krueger | |
| 2013/0117748 A1 | 5/2013 | Cooper et al. | |
| 2013/0124607 A1 | 5/2013 | Griffith et al. | |
| 2013/0124669 A1 * | 5/2013 | Anderson | G06F 11/3006 709/217 |
| 2013/0152047 A1 * | 6/2013 | Moorthi | G06F 11/368 717/124 |
| 2013/0160128 A1 | 6/2013 | Dolan-Gavitt et al. | |
| 2013/0166962 A1 * | 6/2013 | Branson | G06F 11/3065 714/47.3 |
| 2013/0185413 A1 * | 7/2013 | Beaty | G06F 9/5072 709/224 |
| 2013/0262915 A1 * | 10/2013 | Frank | H04L 41/0663 714/4.11 |
| 2013/0275557 A1 * | 10/2013 | Myers | H04N 21/2221 709/219 |
| 2013/0282540 A1 | 10/2013 | Bliesner | |
| 2013/0326625 A1 | 12/2013 | Anderson et al. | |
| 2014/0068769 A1 * | 3/2014 | Neil | H04L 63/1433 726/23 |
| 2014/0115403 A1 | 4/2014 | Rhee et al. | |
| 2014/0129160 A1 | 5/2014 | Tran | |
| 2014/0208296 A1 * | 7/2014 | Dang | G06F 8/75 717/123 |
| 2014/0214745 A1 | 7/2014 | Walsh | |
| 2014/0215057 A1 * | 7/2014 | Walsh | H04L 43/0823 709/224 |
| 2014/0215443 A1 | 7/2014 | Voccio et al. | |
| 2014/0222873 A1 * | 8/2014 | Nakadai | G06F 17/30339 707/803 |
| 2014/0337520 A1 * | 11/2014 | Raleigh | H04L 67/2804 709/224 |
| 2015/0235308 A1 * | 8/2015 | Mick | G06Q 30/08 705/26.3 |

OTHER PUBLICATIONS

NPL-Hardhat-What Constitutes an API Request-2008, Published at https://developer.salesforce.com/forums/?id=906F00000008jcXIAQ 2008.*

(56) References Cited

OTHER PUBLICATIONS

NPL-Loadstrom-Load Testing Metrics-2012, Loadstrom.com, title: "Load Testing Metrics", located at :http://loadstorm.com/load-testing-metrics/ , 2012.*
Openstack LLC, "OpenStack: Install and Deploy Manual," (available at http://docs.openstack.org), May 31, 2012, (99 pages).
Chang Ho Choi et al: "CSMonitor: a visual client/server monitor for CORBA-based distributed applications", Software Engineering Conference, 1998. Proceedings. 1998 Asia Pacific Taipei, Taiwan Dec. 2-4, 1998, Los Alamitos, CA, USA, IEEE Comput. Soc, US, Dec. 2, 1998 (Dec. 2, 1998), pp. 338-345, XP010314829, DOI: 10.1109/APSEC.1998.733738: ISBN: 978-0-8186-9183-6.
Moe J et al: "Understanding distributed systems via execution trace data", Program Comprehension, 2001. IWPC 2001. Proceedings. 9th International Workshop on May 12-13, 2001, Piscataway, NJ, USA, IEEE, May 12, 2001 (May 12, 2001), pp. 60-67, XP010541004, ISBN: 978-0-7695-1131-3.
Andrews Ayers et al: "TraceBack", Proceedings of the 2009 ACM SIGPLAN Conference on Programming Language Design and Implementation, PLDI '09, vol. 40, No. 6, Jun. 12, 2005 (Jun. 12, 2005), p. 201, XP055108756, New York, USA, ISSN: 0362-1340, DOI: 10.1145/1064978.1065035: ISBN: 978-1-60-558392-1.
Baah G K et al: "The Probabilistic Program Dependence Graph and Its Application to Fault Diagnosis", IEEE Transactions on Software Engineering, IEEE Service Center, Los Alamitos, CA, US, vol. 36, No. 4, Jul. 1, 2010 (Jul. 1, 2010), pp. 528-545, XP011299543, ISSN: 0098-5589.
Alexander Ihler et al: "Learning to detect events with Markov-modulated Poisson processes", ACM Transactions on Knowledge Discovery From Data, vol. 1, No. 3, Dec. 1, 2007 (Dec. 1, 2007), pp. 13-3s, XP055108758, ISSN: 1556-4681, DOI: 10.1145/1297332.1297337.
Anonymous, "Valgrind Documentation Release 3.8.0", Aug. 20, 2012, pp. 1-320, XP055113787, http://valgrind.org/downloads/valgrind.
& Nn, "Valgrind Archive 3.8.1 screenshot", Aug. 10, 2012, pp. 1-1, http://valgrind.org/downloads/valgrind- 3.8.1.tar.bz2.
Tilman Kostner et al., "Argument Controlled Profiling", Aug. 25, 2009, Technische Universitii.t MOnchen, Germany.
Nicholas Nethercote et al, "Valgrind—A Program Supervision Framework", Electronic Notes in Theoretical Computer Science, Oct. 1, 2003, pp. 1-23, vol. 89, No. 2, Elsevier, Amsterdam, NL.
Yemini-Hidden Markov Model Training 2016, available at http://www.cs.columbia.edu/4761/notes07/chapter4.3-HMM.pdf, 2016.
Parr-Hidden Markov Model 2003, available at https://www.cs.duke.edu/courses/fall03/cps260/notes/lecture14.pdf, 2003.

* cited by examiner

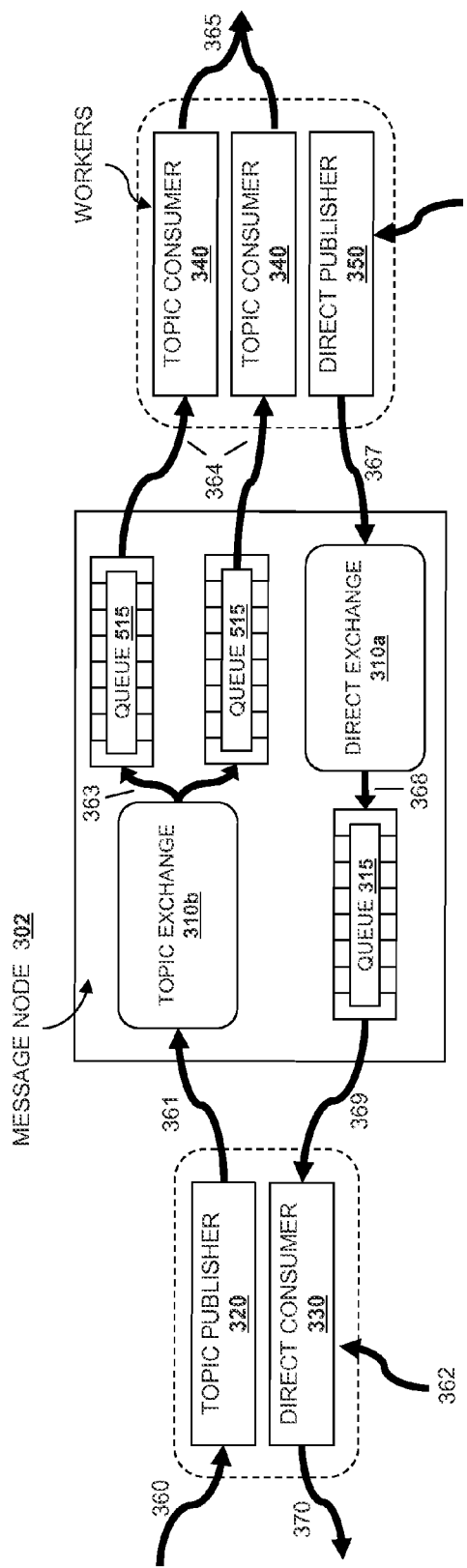
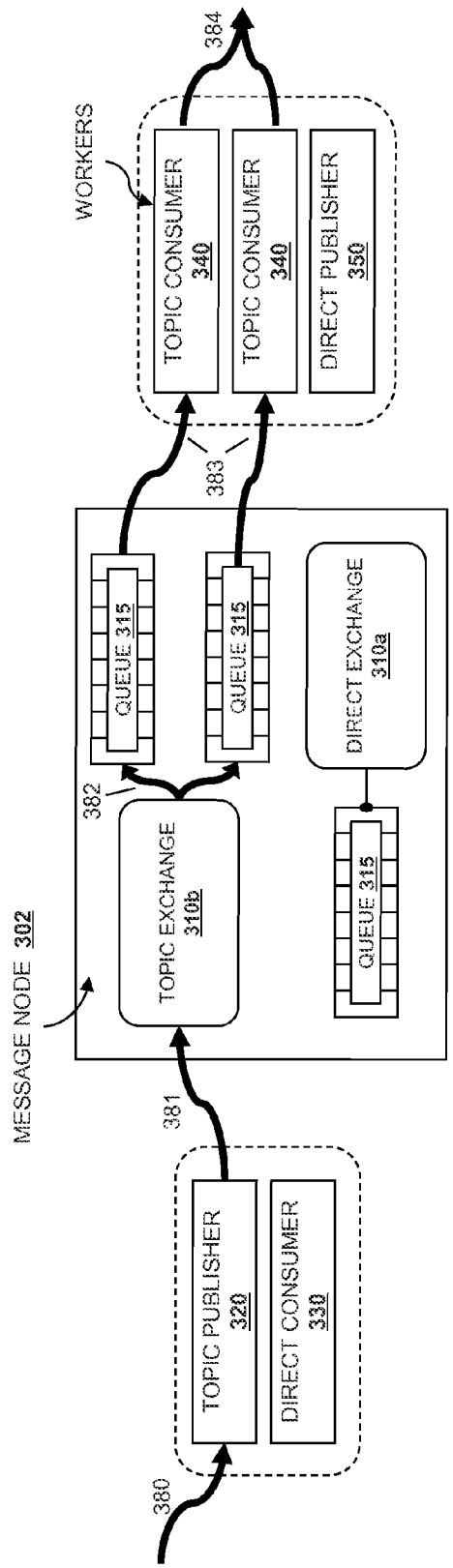

```
                    API Request Record
                           900
905
    ╲  API Request ID: #6789
910
    ╲  Received: 10:00 AM
915
    ╲  HTTP Code 202 Response Issued: 10:01 AM
920
    ╲  Process XYZ Started: 10:05 AM
925
    ╲  Process XYZ Error Code #4321: 10:15 AM
930
    ╲  Process XYZ Restart: 10:20 AM
935
    ╲  Process XYZ Complete: 11:25AM AM
940
    ╲  Time Threshold Failure: Runtime Exceeded Threshold (00:25 Min.)
```

FIG. 9

METHODS AND SYSTEMS OF MONITORING FAILURES IN A DISTRIBUTED NETWORK SYSTEM

BACKGROUND

This application is a continuation-in-part of, and claims priority to, co-pending non-provisional U.S. patent applications Ser. No. 13/752,147 entitled "Methods and Systems of Distributed Tracing," filed Jan. 28, 2013, 13/752,255 entitled "Methods and Systems of Generating a billing feed of a distributed network," filed Jan. 28, 2013, and 13/752,234 entitled "Methods and Systems of Function-Specific Tracing," filed Jan. 28, 2013, each of which are incorporated, in their entirety, herein by reference. This application is related to co-pending non-provisional U.S. patent Applications Ser. No. 13/841,330, entitled "Methods and Systems of Tracking and Verifying Records of System Change Events in a Distributed Network System," filed Mar. 15, 2013, and 13/841,552, entitled "Methods and Systems of Predictive Monitoring of Objects in a Distributed Network System," filed Mar. 15, 2013, each of which are incorporated, in their entirety, herein by reference.

The present disclosure relates generally to cloud computing, and more particularly to systems and methods of monitoring failures in a distributed network system providing cloud services.

Consumers of resources on a distributed network system providing cloud services may, from time to time, request metrics or reports related to the quality of services provided by the service provider. For example, many consumers may have Service Level Agreements (SLAs) in place with services providers that guarantee certain performance or service quality levels. Service availability and responsiveness to service requests may be among the desired metrics.

A cloud service provider may generate reports for customers, which provide metrics related to system availability and responsiveness to requests for system resources. One such metric is often a rate of failure to fulfill customer requests. Typically such reports only provide metrics with respect to server errors, often referred to as Hypertext Transfer Protocol (HTTP) Server-Side Failures and responses. 5XX refers to the HTTP error codes associated with various server failures. For example, 5XX errors may include error 500 (internal server error), error 501 (request not implemented), error 502 (bad gateway), error 503 (service unavailable), error 504 (gateway timeout), etc. One of ordinary skill in the art will recognize the various 5xx server error codes associated with HTTP.

The reliability of such metrics may be of interest because there may be financial consequences associated with failures to meet SLA terms. Also, there may be certain situations, which a customer would consider an error or fault, but which would not be counted as a failure under a conventional failure reporting methods.

BRIEF DESCRIPTION OF THE DRAWINGS

FIG. 3b is a diagram showing how a directed message is sent using the message service according to various embodiments.
FIG. 3c is a diagram showing how a broadcast message is sent using the message service according to various embodiments.
FIG. 9 illustrates one embodiment of an API request record.

DETAILED DESCRIPTION

The following disclosure has reference to monitoring failures in a distributed network system providing cloud services.

In one embodiment, the methods and systems may include receiving an Application Program Interface (API) request, assigning a unique identifier to the API request, recording, in association with the unique identifier, receipt time corresponding to a time at which the API request is received, and associating one or more system state changes with the unique identifier. Advantageously, the present embodiments provide a more accurate failure monitoring and associated metrics. Additional benefits and advantages of the present embodiments will become evident in the following description.

Figure 1A:
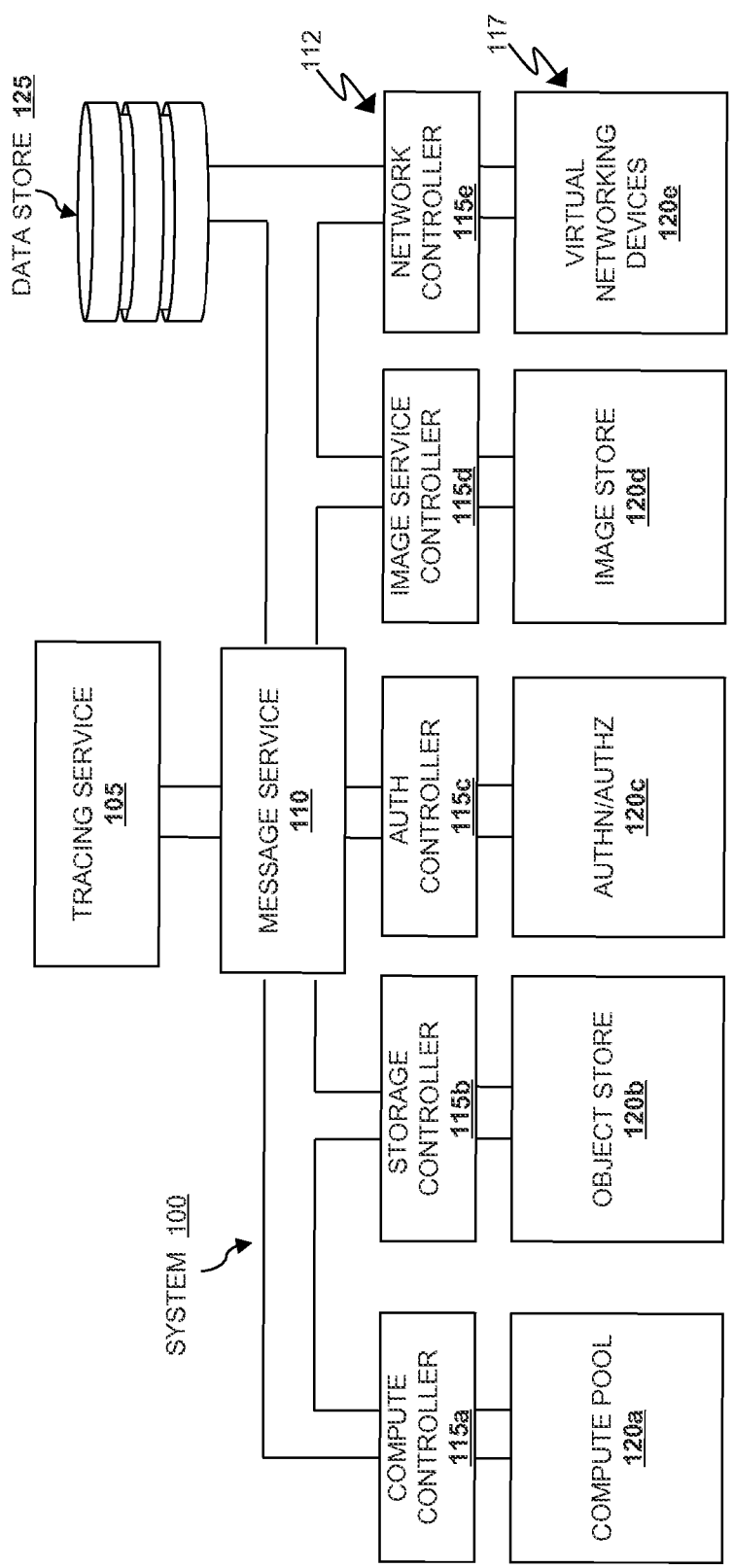
FIG. 1a is a schematic view of a distributed system.

FIG. 1A illustrates a simplified diagram of a distributed application 100 for which various embodiments of monitoring failures in a distributed network system may be implemented. It should be appreciated that application 100 is provided merely as an example and that other suitable distributed applications, middleware, or computing systems can benefit from distributed system status verification capabilities described herein. According to one embodiment, application 100 may be a cloud service.

According to one embodiment, application 100 includes event manager 106 configured to provide failure monitoring services. As will be described in more detail below, failure monitoring can include recording events associated with an API request and reporting a failure rate in response to those events. By way of example, event manager 106 can observe messages within the distributed application across queues and from particular components of the application. As depicted in FIG. 1A, event manager 106 interfaces with message service 110 of application 100. Message service 110 connects various subsystems of the application 100, and message service 110 may be configured to pass messages relative to one or more elements of system 100.

System 100 may include one or more subsystems, such as controllers 112 and services 117. System 100 may include one or more controllers 112 for the application to be employed in a distributed architecture, such as cloud computing services. As depicted in FIG. 1A, controllers 112 include a compute controller 115a, a storage controller 115b, auth controller 115c, image service controller 115d and network controller 115e. Controllers 115 are described with reference to a cloud computing architecture in FIG. 1. By way of example, network controller 115a deals with host machine network configurations and can perform operations for allocating IP addresses, configuring VLANs, implementing security groups and configuring networks. Each of controllers 112 may interface with one or more services. As depicted in FIG. 1A, compute controller 115a interfaces with compute pool 120a, storage controller 115b may interface with object store 120b, auth controller 115c may interface with authentication/authorization controller 120c, image service controller 115d may interface with image store 120d and network controller 115e may interface with virtual networking devices 120e. Although controllers 115 and services 120 are with reference to an open architecture, it should be appreciated that the methods and systems for tracing may be equally applied to other distributed applications.

Figure 1B:
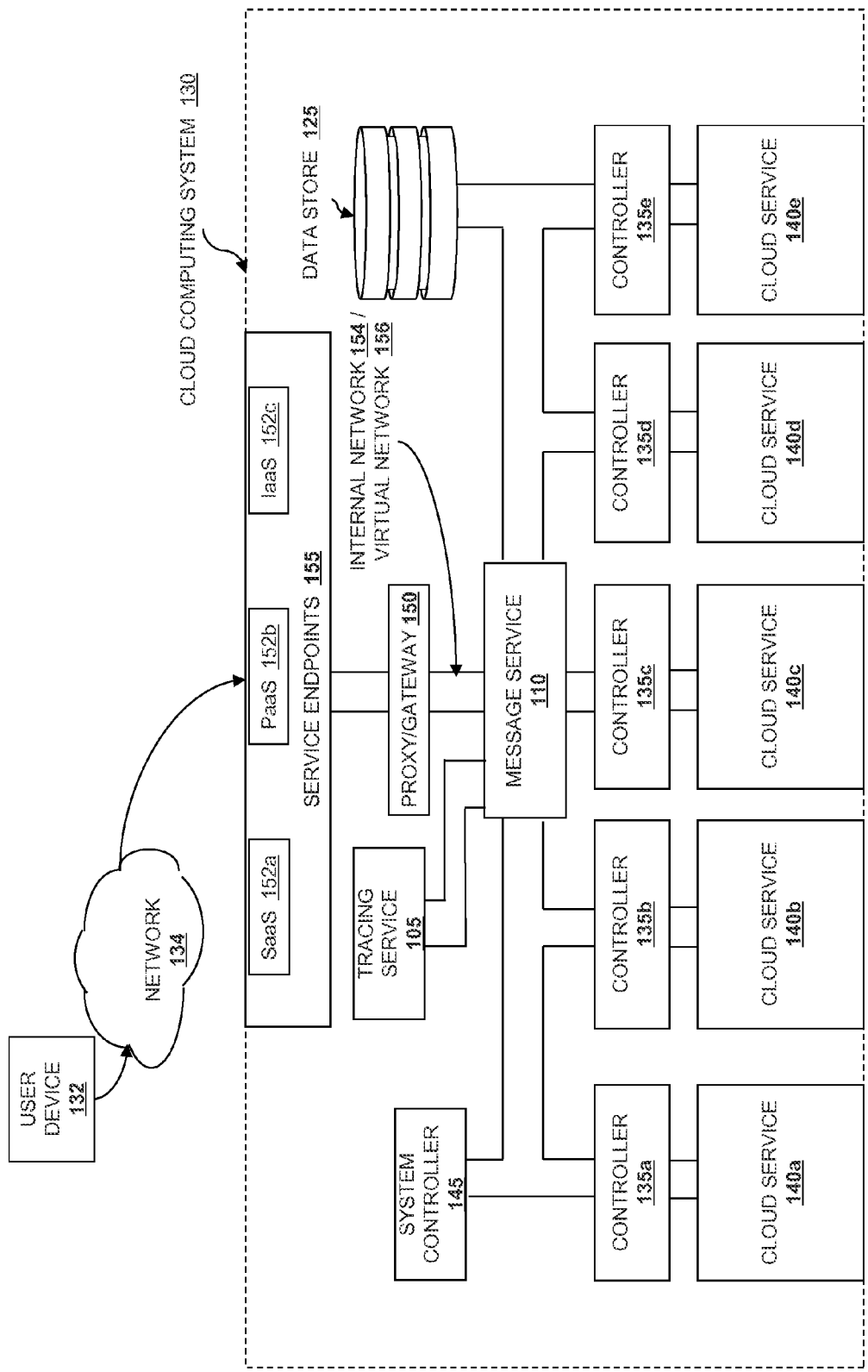
FIG. 1b is a schematic view illustrating an external view of a cloud computing system.

Referring now to FIG. 1b, an external view of a cloud computing system 130 is illustrated. Cloud computing system 130 includes event manager 106 and message service 110. According to one embodiment, event manager 106 can observe messages of cloud computing system 130, including API requests, and generate records of responses to the API requests from services of the cloud computing system 130. According to another embodiment, controllers and services of the cloud computing system 130 may include event managers to monitor failures of various components of cloud computing system 130.

The cloud computing system 130 includes a user device 132 connected to a network 134 such as, for example, a Transport Control Protocol/Internet Protocol (TCP/IP) network (e.g., the Internet.) The user device 132 is coupled to the cloud computing system 130 via one or more service endpoints 155. Depending on the type of cloud service provided, these endpoints give varying amounts of control relative to the provisioning of resources within the cloud computing system 130. For example, SaaS endpoint 152a typically only gives information and access relative to the application running on the cloud storage system, and the scaling and processing aspects of the cloud computing system is obscured from the user. PaaS endpoint 152b typically gives an abstract Application Programming Interface (API) that allows developers to declaratively request or command the backend storage, computation, and scaling resources provided by the cloud, without giving exact control to the user. IaaS endpoint 152c typically provides the ability to directly request the provisioning of resources, such as computation units (typically virtual machines), software-defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions. This allows the cloud computing system 130 to be used for new, user-defined services without requiring specific support.

It is important to recognize that the control allowed via an IaaS endpoint is not complete. Within the cloud computing system 130 are one or more cloud controllers 135 (running what is sometimes called a "cloud operating system") that work on an even lower level, interacting with physical machines, managing the contradictory demands of the multi-tenant cloud computing system 130. In one embodiment, these correspond to the controllers and services discussed relative to FIG. 1a. The workings of the cloud controllers 135 are typically not exposed outside of the cloud computing system 130, even in an IaaS context. In one embodiment, the commands received through one of the service endpoints 155 are then routed via one or more internal networks 154. The internal network 154 couples the different services to each other. The internal network 154 may encompass various protocols or services, including but not limited to electrical, optical, or wireless connections at the physical layer; Ethernet, Fiber channel, ATM, and SONET at the MAC layer; TCP, UDP, ZeroMQ or other services at the connection layer; and XMPP, HTTP, AMPQ, STOMP, SMS, SMTP, SNMP, or other standards at the protocol layer. The internal network 154 is typically not exposed outside the cloud computing system, except to the extent that one or more virtual networks 156 may be exposed that control the internal routing according to various rules. The virtual networks 156 typically do not expose as much complexity as may exist in the actual internal network 154; but varying levels of granularity can be exposed to the control of the user, particularly in IaaS services.

In one or more embodiments, it may be useful to include various processing or routing nodes in the network layers 154 and 156, such as proxy/gateway 150. Other types of processing or routing nodes may include switches, routers, switch fabrics, caches, format modifiers, or correlators. These processing and routing nodes may or may not be visible to the outside. It is typical that one level of processing or routing nodes may be internal only, coupled to the internal network 154, whereas other types of network services may be defined by or accessible to users, and show up in one or more virtual networks 156. Either of the internal network 154 or the virtual networks 156 may be encrypted or authenticated according to the protocols and services described below.

In various embodiments, one or more parts of the cloud computing system 130 may be disposed on a single host. Accordingly, some of the "network" layers 154 and 156 may be composed of an internal call graph, inter-process communication (IPC), or a shared memory communication system.

Once a communication passes from the endpoints via a network layer 154 or 156, as well as possibly via one or more switches or processing devices 150, it is received by one or more applicable cloud controllers 135. The cloud controllers 135 are responsible for interpreting the message and coordinating the performance of the necessary corresponding services, returning a response if necessary. Although the cloud controllers 135 may provide services directly, more typically the cloud controllers 135 are in operative contact with the service resources 140 necessary to provide the corresponding services. For example, it is possible for different services to be provided at different levels of abstraction. For example, a service 140a may be a "compute" service that will work at an IaaS level, allowing the creation and control of user-defined virtual computing resources. In addition to the services discussed relative to FIG. 1a, a cloud computing system 130 may provide a declarative storage API, a SaaS-level Queue service 140c, a DNS service 140d, or a Database service 140e, or other application services without exposing any of the underlying scaling or computational resources. Other services are contemplated as discussed in detail below.

In various embodiments, various cloud computing services or the cloud computing system itself may require a message passing system. The message routing service 110 is available to address this need, but it is not a required part of the system architecture in at least one embodiment. In one embodiment, the message routing service is used to transfer messages from one component to another without explicitly linking the state of the two components. Note that this message routing service 110 may or may not be available for user-addressable systems; in one preferred embodiment, there is a separation between storage for cloud service state and for user data, including user service state.

In various embodiments, various cloud computing services or the cloud computing system itself may require a persistent storage for system state. The data store 125 is available to address this need, but it is not a required part of the system architecture in at least one embodiment. In one embodiment, various aspects of system state are saved in redundant databases on various hosts or as special files in an object storage service. In a second embodiment, a relational database service is used to store system state. In a third embodiment, a column, graph, or document-oriented database is used. Note that this persistent storage may or may not be available for user-addressable systems; in one preferred embodiment, there is a separation between storage for cloud service state and for user data, including user service state.

In various embodiments, it may be useful for the cloud computing system 130 to have a system controller 145. In one embodiment, the system controller 145 is similar to the cloud computing controllers 135, except that it is used to control or direct operations at the level of the cloud computing system 130 rather than at the level of an individual service.

For clarity of discussion above, only one user device 132 has been illustrated as connected to the cloud computing system 130, and the discussion generally referred to receiving a communication from outside the cloud computing system, routing it to a cloud controller 135, and coordinating processing of the message via a service 130, the infrastructure described is also equally available for sending out messages. These messages may be sent out as replies to previous communications, or they may be internally sourced. Routing messages from a particular service 130 to a user device 132 is accomplished in the same manner as receiving a message from user device 132 to a service 130, just in reverse. The precise manner of receiving, processing, responding, and sending messages is described below with reference to the various discussed service embodiments. One of skill in the art will recognize, however, that a plurality of user devices 132 may, and typically will, be connected to the cloud computing system 130 and that each element or set of elements within the cloud computing system is replicable as necessary. Further, the cloud computing system 130, whether or not it has one endpoint or multiple endpoints, is expected to encompass embodiments including public clouds, private clouds, hybrid clouds, and multi-vendor clouds.

Figure 2:
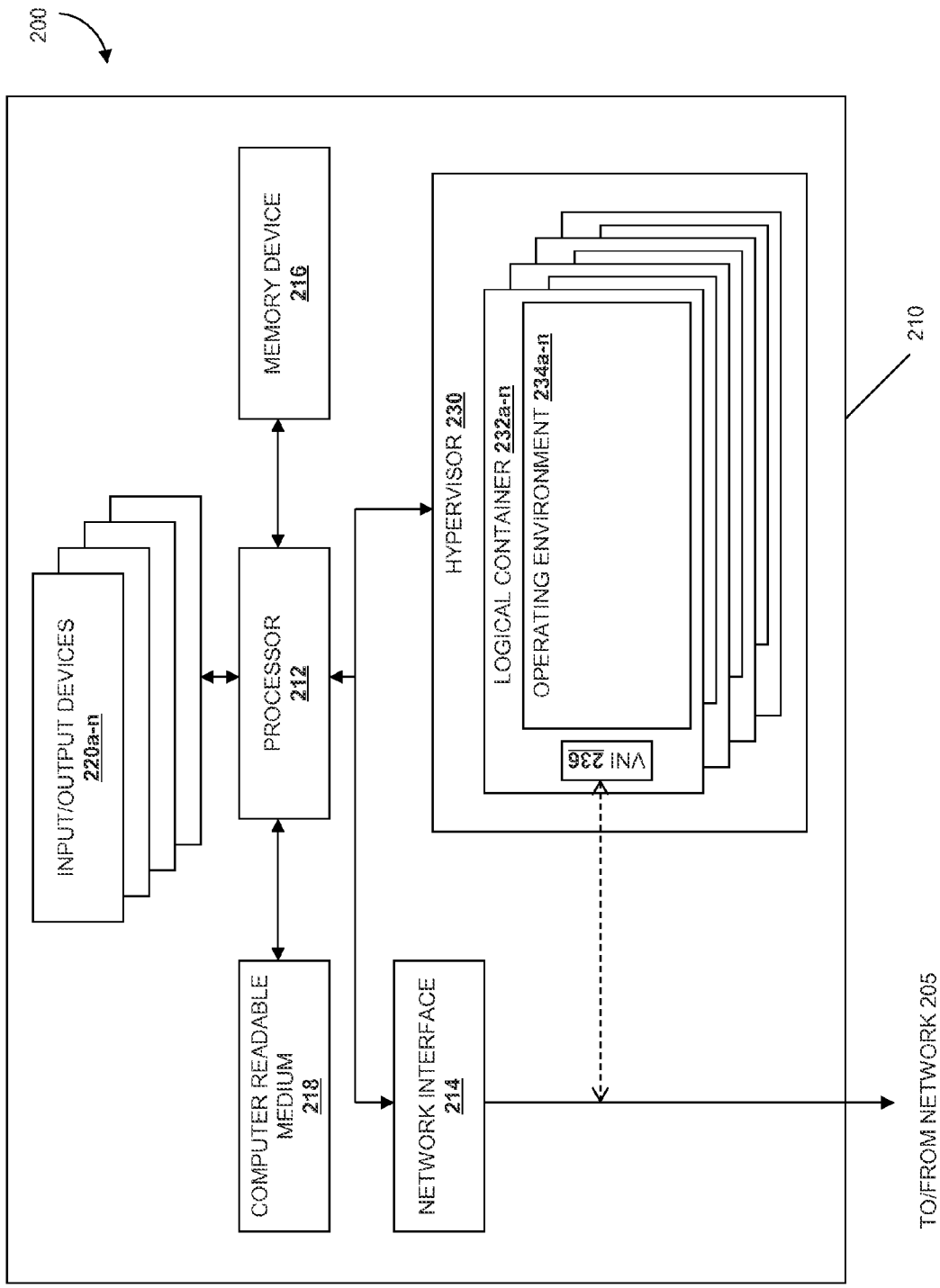
FIG. 2 is a schematic view illustrating an information processing system as used in various embodiments.

Each of the user device 132, the cloud computing system 130, the endpoints 152, the cloud controllers 135 and the cloud services 140 typically include a respective information processing system, a subsystem, or a part of a subsystem for executing processes and performing operations (e.g., processing or communicating information). An information processing system is an electronic device capable of processing, executing or otherwise handling information, such as a computer. FIG. 2 shows an information processing system 210 that is representative of one of, or a portion of, the information processing systems described above.

Referring now to FIG. 2, diagram 200 shows an information processing system 210 configured to host one or more virtual machines, coupled to a network 205. The network 205 could be one or both of the networks 154 and 156 described above. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 210 shown is representative of, one of, or a portion of, the information processing systems described above.

The information processing system 210 may include any or all of the following: (a) a processor 212 for executing and otherwise processing instructions, (b) one or more network interfaces 214 (e.g., circuitry) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below.

In one embodiment, there is more than one network interface 214, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 210 may include a plurality of input/output devices 220a-n which are operably coupled to the processor 212, for inputting or outputting information, such as a display device 220a, a print device 220b, or other electronic circuitry 220c-n for performing other operations of the information processing system 210 known in the art.

With reference to the computer-readable media, including both memory device 216 and secondary computer-readable medium 218, the computer-readable media and the processor 212 are structurally and functionally interrelated with one another as described below in further detail, and information processing system of the illustrative embodiment is structurally and functionally interrelated with a respective computer-readable medium similar to the manner in which the processor 212 is structurally and functionally interrelated with the computer-readable media 216 and 218. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 200). Such interrelationships permit the data structures' functionality to be realized. For example, in one embodiment the processor 212 reads (e.g., accesses or copies) such functional descriptive material from the network interface 214, the computer-readable media 218 onto the memory device 216 of the information processing system 210, and the information processing system 210 (more particularly, the processor 212) performs its operations, as described elsewhere herein, in response to such material stored in the memory device of the information processing system 210. In addition to reading such functional descriptive material from the computer-readable medium 218, the processor 212 is capable of reading such functional descriptive material from (or through) the network 105. In one embodiment, the information processing system 210 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 210, without limiting them to a specific location or implementation.

The information processing system 210 includes a hypervisor 230. The hypervisor 230 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 218. The hypervisor may be included logically "below" a host operating system, as a host itself, as part of a larger host operating system, or as a program or process running "above" or "on top of" a host operating system. Examples of hypervisors include Xenserver, KVM, VMware, Microsoft's Hyper-V, and emulation programs such as QEMU.

The hypervisor 230 includes the functionality to add, remove, and modify a number of logical containers 232a-n associated with the hypervisor. Zero, one, or many of the logical containers 232a-n contain associated operating environments 234a-n. The logical containers 232a-n can implement various interfaces depending upon the desired characteristics of the operating environment. In one embodiment, a logical container 232 implements a hardware-like interface, such that the associated operating environment 234 appears to be running on or within an information processing system such as the information processing system 210. For example, one embodiment of a logical container 234 could implement an interface resembling an x86, x86-64, ARM, or other computer instruction set with appropriate RAM, busses, disks, and network devices. A corresponding operating environment 234 for this embodiment could be an operating system such as Microsoft Windows, Linux, Linux-Android, or Mac OS X. In another embodiment, a logical container 232 implements an operating system-like interface, such that the associated operating environment 234 appears to be running on or within an operating system. For example one embodiment of this type of logical container 232 could appear to be a Microsoft Windows, Linux, or Mac OS X operating system. Another possible operating system includes an Android operating system, which includes significant runtime functionality on top of a lower-level kernel. A corresponding operating environment 234 could enforce separation between users and processes such that each process or group of processes appeared to have sole access to the resources of the operating system. In a third environment, a logical container 232 implements a software-defined interface, such a language runtime or logical process that the associated operating environment 234 can use to run and interact with its environment. For example one embodiment of this type of logical container 232 could appear to be a Java, Dalvik, Lua, Python, or other language virtual machine. A corresponding operating environment 234 would use the built-in threading, processing, and code loading capabilities to load and run code. Adding, removing, or modifying a logical container 232 may or may not also involve adding, removing, or modifying an associated operating environment 234. For ease of explanation below, these operating environments will be described in terms of an embodiment as "Virtual Machines," or "VMs," but this is simply one implementation among the options listed above.

In one or more embodiments, a VM has one or more virtual network interfaces 236. How the virtual network interface is exposed to the operating environment depends upon the implementation of the operating environment. In an operating environment that mimics a hardware computer, the virtual network interface 236 appears as one or more virtual network interface cards. In an operating environment that appears as an operating system, the virtual network interface 236 appears as a virtual character device or socket. In an operating environment that appears as a language runtime, the virtual network interface appears as a socket, queue, message service, or other appropriate construct. The virtual network interfaces (VNIs) 236 may be associated with a virtual switch (Vswitch) at either the hypervisor or container level. The VNI 236 logically couples the operating environment 234 to the network, and allows the VMs to send and receive network traffic. In one embodiment, the physical network interface card 214 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

Message Service

Between the various virtual machines and virtual devices, it may be necessary to have a reliable messaging infrastructure. In various embodiments, a message queuing service is used for both local and remote communication so that there is no requirement that any of the services exist on the same physical machine. Various existing messaging infrastructures are contemplated, including AMQP, ZeroMQ, STOMP and XMPP. Note that this messaging system may or may not be available for user-addressable systems; in one preferred embodiment, there is a separation between internal messaging services and any messaging services associated with user data.

In one embodiment, the message service sits between various components and allows them to communicate in a loosely coupled fashion. This can be accomplished using Remote Procedure Calls (RPC hereinafter) to communicate between components, built atop either direct messages and/ or an underlying publish/subscribe infrastructure. In a typical embodiment, it is expected that both direct and topic-based exchanges are used. This allows for decoupling of the components, full asynchronous communications, and transparent balancing between equivalent components. In some embodiments, calls between different APIs can be supported over the distributed system by providing an adapter class which takes care of marshalling and unmarshalling of messages into function calls.

In one embodiment, a cloud controller 135 (or the applicable cloud service 140) creates two queues at initialization time, one that accepts node-specific messages and another that accepts generic messages addressed to any node of a particular type. This allows both specific node control as well as orchestration of the cloud service without limiting the particular implementation of a node. In an embodiment in which these message queues are bridged to an API, the API can act as a consumer, server, or publisher.

Figure 3A:
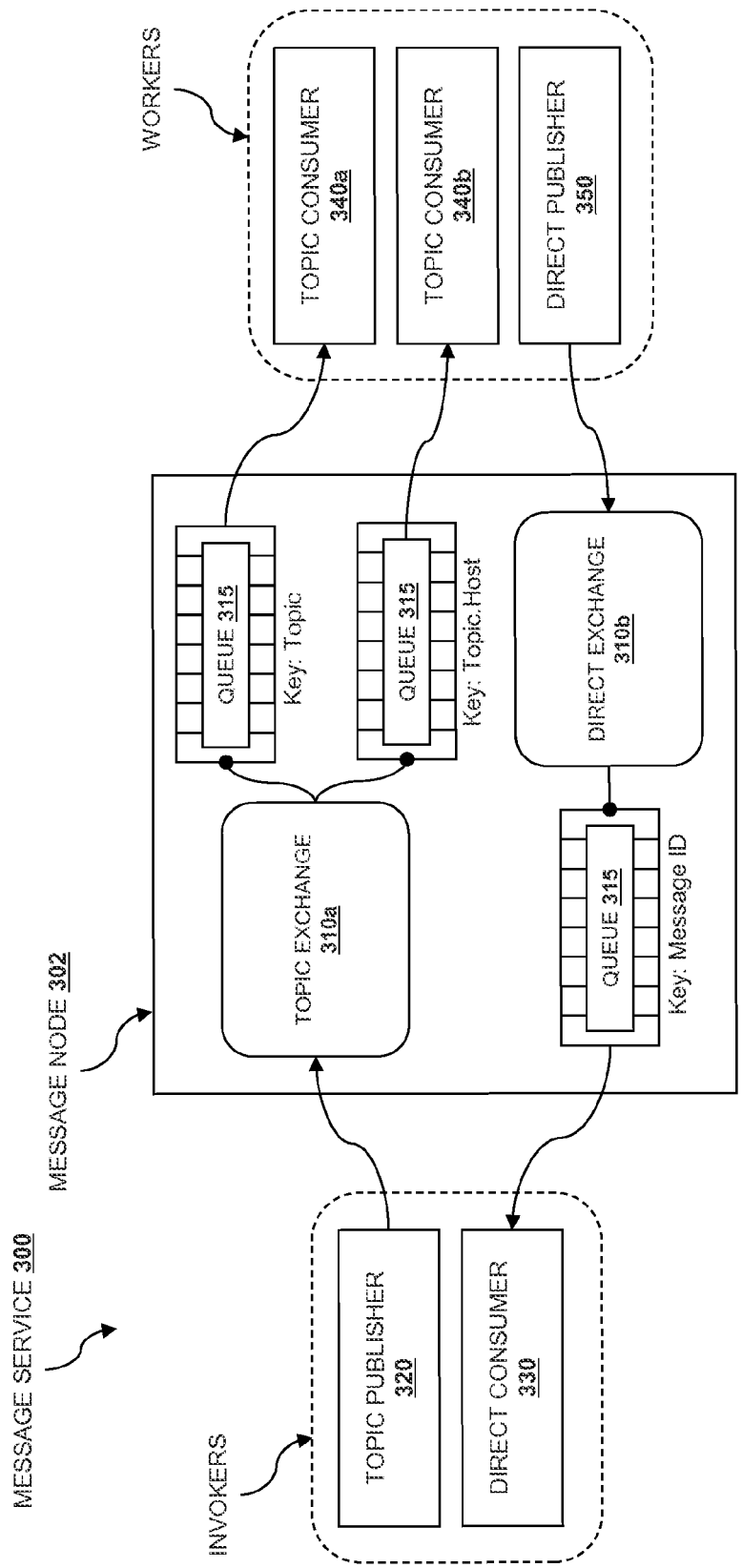
FIG. 3a shows a message service system according to various embodiments.

Turning now to FIG. 3a, one implementation of a message service 110 is shown. For simplicity of description, FIG. 3a shows the message service 300 when a single instance is deployed and shared in the cloud computing system 130, but the message service can be either centralized or fully distributed.

In one embodiment, the message service 300 keeps traffic associated with different queues or routing keys separate, so that disparate services can use the message service without interfering with each other. Accordingly, the message queue service may be used to communicate messages between network elements, between cloud services 140, between cloud controllers 135, between network elements, or between any group of sub-elements within the above. More than one message service may be used, and a cloud service 140 may use its own message service as required.

For clarity of exposition, access to the message service will be described in terms of "Invokers" and "Workers," but these labels are purely expository and are not intended to convey a limitation on purpose; in some embodiments, a single component (such as a VM) may act first as an Invoker, then as a Worker, the other way around, or simultaneously in each role. An Invoker is a component that sends messages in the system via two operations: 1) an RPC (Remote Procedure Call) directed message and ii) an RPC broadcast. A Worker is a component that receives messages from the message system and replies accordingly.

In one embodiment, there is a message node 302 including one or more exchanges 310. In a second embodiment, the message system is "brokerless," and one or more exchanges are located at each client. The exchanges 310 act as internal message routing elements so that components interacting with the message service can send and receive messages. In one embodiment, these exchanges are subdivided further into a topic exchange 310a and a direct exchange 310b. An exchange 310 is a routing structure or system that exists in a particular context. In a one embodiment, multiple contexts can be included within a single message service with each one acting independently of the others. In one embodiment, the type of exchange, such as a topic exchange 310a vs. direct exchange 310b determines the routing policy. In a second embodiment, the routing policy is determined via a series of routing rules evaluated by the exchange 310.

The direct exchange 310a is a routing element created during or for RPC directed message operations. In one embodiment, there are many instances of a direct exchange 310a that are created as needed for the message service. In a further embodiment, there is one direct exchange 310a created for each RPC directed message received by the system.

The topic exchange 310a is a routing element created during or for RPC directed broadcast operations. In one simple embodiment, every message received by the topic exchange is received by every other connected component. In a second embodiment, the routing rule within a topic exchange is described as publish-subscribe, wherein different components can specify a discriminating function and only topics matching the discriminator are passed along. In one embodiment, there are many instances of a topic exchange 310b that are created as needed for the message service. In one embodiment, there is one topic-based exchange for every topic created in the cloud computing system. In a second embodiment, there are a set number of topics that have pre-created and persistent topic exchanges 310b.

Within one or more of the exchanges 310, it may be useful to have a queue element 315. A queue 315 is a message stream; messages sent into the stream are kept in the queue 315 until a consuming component connects to the queue and fetches the message. A queue 315 can be shared or can be exclusive. In one embodiment, queues with the same topic are shared amongst Workers subscribed to that topic.

In a typical embodiment, a queue 315 will implement a FIFO policy for messages and ensure that they are delivered in the same order that they are received. In other embodiments, however, a queue 315 may implement other policies, such as LIFO, a priority queue (highest-priority messages are delivered first), or age (oldest objects in the queue are delivered first), or other configurable delivery policies. In other embodiments, a queue 315 may or may not make any guarantees related to message delivery or message persistence.

In one embodiment, element 320 is a topic publisher. A topic publisher 320 is created, instantiated, or awakened when an RPC directed message or an RPC broadcast operation is executed; this object is instantiated and used to push a message to the message system. Every publisher connects always to the same topic-based exchange; its life-cycle is limited to the message delivery.

In one embodiment, element 330 is a direct consumer. A direct consumer 330 is created, instantiated, or awakened if an RPC directed message operation is executed; this component is instantiated and used to receive a response message from the queuing system. Every direct consumer 330 connects to a unique direct-based exchange via a unique exclusive queue, identified by a UUID or other unique name. The life-cycle of the direct consumer 330 is limited to the message delivery. In one embodiment, the exchange and queue identifiers are included the message sent by the topic publisher 320 for RPC directed message operations.

In one embodiment, elements 340 (elements 340a and 340b) are topic consumers. In one embodiment, a topic consumer 340 is created, instantiated, or awakened at system start. In a second embodiment, a topic consumer 340 is created, instantiated, or awakened when a topic is registered with the message system 300. In a third embodiment, a topic consumer 340 is created, instantiated, or awakened at the same time that a Worker or Workers are instantiated and persists as long as the associated Worker or Workers have not been destroyed. In this embodiment, the topic consumer 340 is used to receive messages from the queue and it invokes the appropriate action as defined by the Worker role. A topic consumer 340 connects to the topic-based exchange either via a shared queue or via a unique exclusive queue. In one embodiment, every Worker has two associated topic consumers 340, one that is addressed only during an RPC broadcast operations (and it connects to a shared queue whose exchange key is defined by the topic) and the other that is addressed only during an RPC directed message operations, connected to a unique queue whose with the exchange key is defined by the topic and the host.

In one embodiment, element 350 is a direct publisher. In one embodiment, a direct publisher 350 is created, instantiated, or awakened for RPC directed message operations and it is instantiated to return the message required by the request/response operation. The object connects to a direct-based exchange whose identity is dictated by the incoming message.

Turning now to FIG. 3b, one embodiment of the process of sending an RPC directed message is shown relative to the elements of the message system 300 as described relative to FIG. 3a. All elements are as described above relative to FIG. 3a unless described otherwise. At step 360, a topic publisher 320 is instantiated. At step 361, the topic publisher 320 sends a message to an exchange 310b. At step 362, a direct consumer 330 is instantiated to wait for the response message. At step 363, the message is dispatched by the exchange 310b. At step 364, the message is fetched by the topic consumer 340 dictated by the routing key (either by topic or by topic and host). At step 365, the message is passed to a Worker associated with the topic consumer 340. If needed, at step 366, a direct publisher 350 is instantiated to send a response message via the message system 300. At step 367, the direct publisher 340 sends a message to an exchange 310a. At step 368, the response message is dispatched by the exchange 310a. At step 369, the response message is fetched by the direct consumer 330 instantiated to receive the response and dictated by the routing key. At step 370, the message response is passed to the Invoker.

Turning now to FIG. 3c, one embodiment of the process of sending an RPC broadcast message is shown relative to the elements of the message system 300 as described relative to FIG. 3a. All elements are as described above relative to FIG. 3a unless described otherwise. At step 580, a topic publisher 520 is instantiated. At step 381, the topic publisher 320 sends a message to an exchange 310a. At step 382, the message is dispatched by the exchange 310b. At step 383, the message is fetched by a topic consumer 340 dictated by the routing key (either by topic or by topic and host). At step 384, the message is passed to a Worker associated with the topic consumer 340.

Figure 5:
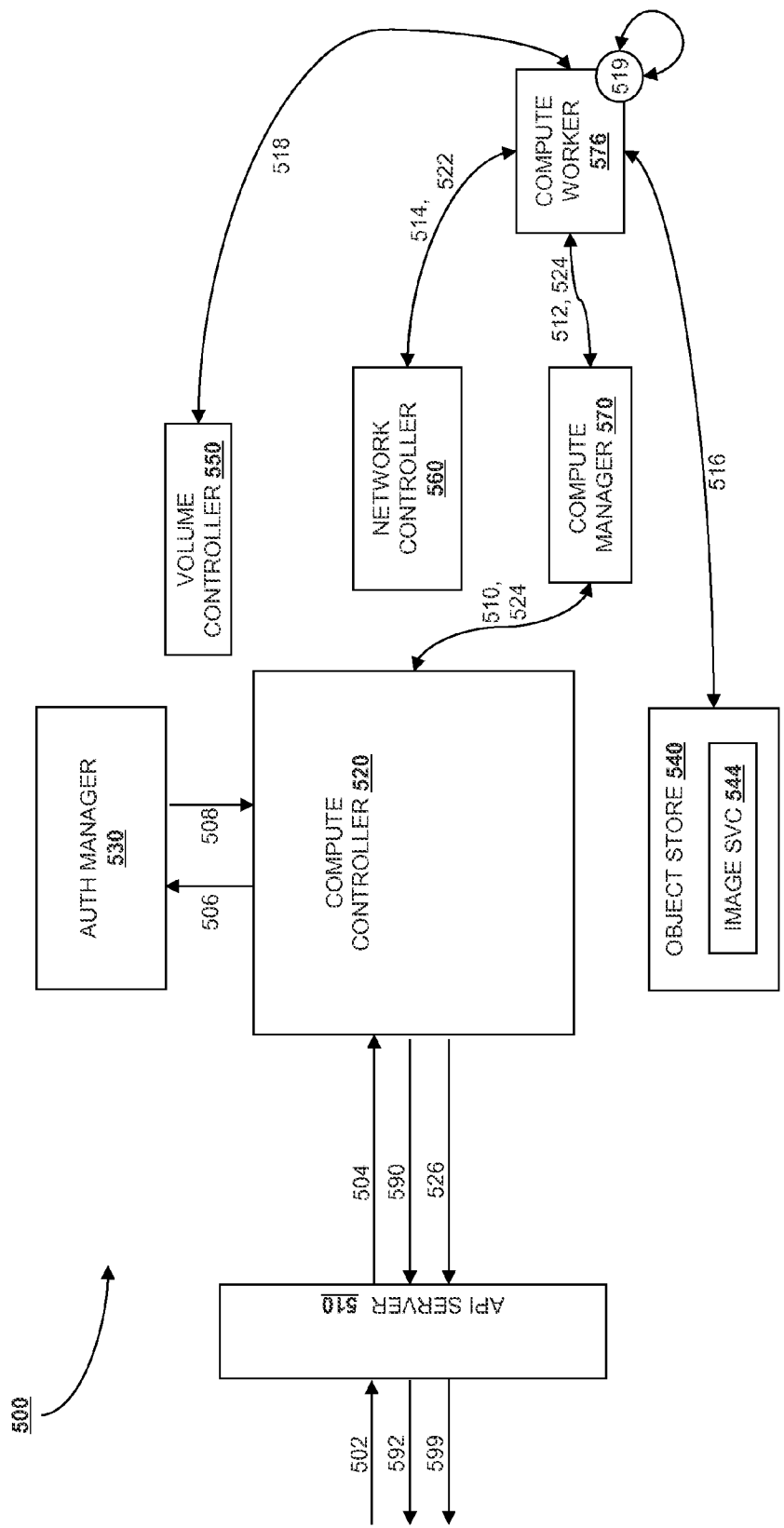
FIG. 5 shows an instantiating and launching process for virtual resources according to various embodiments.

In some embodiments, a response to an RPC broadcast message can be requested. In that case, the process follows the steps outlined relative to FIG. 3b to return a response to the Invoker. As the process of instantiating and launching a VM instance in FIG. 5 shows, requests to a distributed service or application may move through various software components, which may be running on one physical machine or may span across multiple machines and network boundaries.

Figure 4:
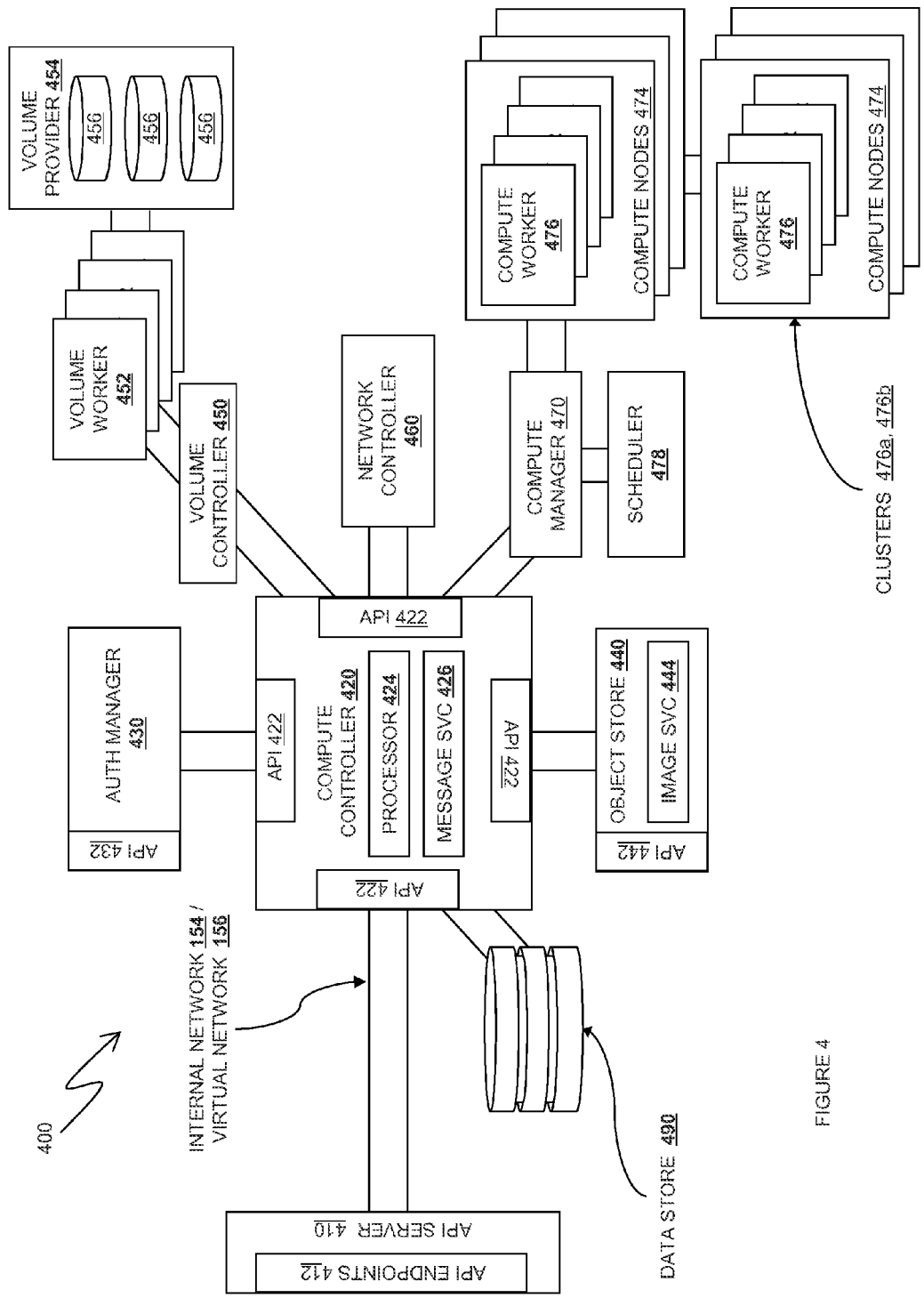
FIG. 4 shows IaaS-style computational cloud service according to various embodiments.

Turning now to FIG. 4, an IaaS-style computational cloud service (a "compute" service) is shown at 400 according to one embodiment. This is one embodiment of a cloud controller 135 with associated cloud service 140 as described relative to FIG. 1b. Except as described relative to specific embodiments, the existence of a compute service does not require or prohibit the existence of other portions of the cloud computing system 130 nor does it require or prohibit the existence of other cloud controllers 135 with other respective services 140.

To the extent that some components described relative to the compute service 400 are similar to components of the larger cloud computing system 130, those components may be shared between the cloud computing system 130 and a compute service 400, or they may be completely separate. Further, to the extent that "controllers," "nodes," "servers," "managers," "VMs," or similar terms are described relative to the compute service 400, those can be understood to comprise any of a single information processing device 210 as described relative to FIG. 2, multiple information processing devices 210, a single VM as described relative to FIG. 2, a group or cluster of VMs or information processing devices as described relative to FIG. 3. These may run on a single machine or a group of machines, but logically work together to provide the described function within the system.

In one embodiment, compute service 400 includes an API Server 410, a Compute Controller 420, an Auth Manager 430, an Object Store 440, a Volume Controller 450, a Network Controller 460, and a Compute Manager 470. These components are coupled by a communications network of the type previously described. In one embodiment, communications between various components are message-oriented, using HTTP or a messaging protocol such as AMQP, ZeroMQ, or STOMP.

Although various components are described as "calling" each other or "sending" data or messages, one embodiment makes the communications or calls between components asynchronous with callbacks that get triggered when responses are received. This allows the system to be architected in a "shared-nothing" fashion. To achieve the shared-nothing property with multiple copies of the same component, compute service 400 further includes distributed data store 490. Global state for compute service 400 is written into this store using atomic transactions when required. Requests for system state are read out of this store. In some embodiments, results are cached within controllers for short periods of time to improve performance. In various embodiments, the distributed data store 490 can be the same as, or share the same implementation as Object Store 440.

In one embodiment, the API server 410 includes external API endpoints 412. In one embodiment, the external API endpoints 412 are provided over an RPC-style system, such as CORBA, DCE/COM, SOAP, or XML-RPC. These follow the calling structure and conventions defined in their respective standards. In another embodiment, the external API endpoints 412 are basic HTTP web services following a REST pattern and identifiable via URL. Requests to read a value from a resource are mapped to HTTP GETs, requests to create resources are mapped to HTTP PUTs, requests to update values associated with a resource are mapped to HTTP POSTs, and requests to delete resources are mapped to HTTP DELETEs. In some embodiments, other REST-style verbs are also available, such as the ones associated with WebDav. In a third embodiment, the API endpoints 412 are provided via internal function calls, IPC, or a shared memory mechanism. Regardless of how the API is presented, the external API endpoints 412 are used to handle authentication, authorization, and basic command and control functions using various API interfaces. In one embodiment, the same functionality is available via multiple APIs, including APIs associated with other cloud computing systems. This enables API compatibility with multiple existing tool sets created for interaction with offerings from other vendors.

The Compute Controller 420 coordinates the interaction of the various parts of the compute service 400. In one embodiment, the various internal services that work together to provide the compute service 400, are internally decoupled by adopting a service-oriented architecture (SOA). The Compute Controller 420 serves as an internal API server, allowing the various internal controllers, managers, and other components to request and consume services from the other components. In one embodiment, all messages pass through the Compute Controller 420. In a second embodiment, the Compute Controller 420 brings up services and advertises service availability, but requests and responses go directly between the components making and serving the request. In a third embodiment, there is a hybrid model in which some services are requested through the Compute Controller 420, but the responses are provided directly from one component to another.

In one embodiment, communication to and from the Compute Controller 420 is mediated via one or more internal API endpoints 422, provided in a similar fashion to those discussed above. The internal API endpoints 422 differ from the external API endpoints 412 in that the internal API endpoints 422 advertise services only available within the overall compute service 400, whereas the external API endpoints 412 advertise services available outside the compute service 400. There may be one or more internal APIs 422 that correspond to external APIs 412, but it is expected that there will be a greater number and variety of internal API calls available from the Compute Controller 420.

In one embodiment, the Compute Controller 420 includes an instruction processor 424 for receiving and processing instructions associated with directing the compute service 400. For example, in one embodiment, responding to an API call involves making a series of coordinated internal API calls to the various services available within the compute service 400, and conditioning later API calls on the outcome or results of earlier API calls. The instruction processor 424 is the component within the Compute Controller 420 responsible for marshaling arguments, calling services, and making conditional decisions to respond appropriately to API calls.

In one embodiment, the instruction processor 424 is implemented as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor 424, running as a discrete operating environment, as a process in an active operating environment, or can be run from a low-power embedded processor. In a second embodiment, the instruction processor 424 takes the form of a series of interoperating but discrete components, some or all of which may be implemented as software programs. In another embodiment, the instruction processor 424 is a discrete component, using a small amount of flash and a low power processor, such as a low-power ARM processor. In a further embodiment, the instruction processor includes a rule engine as a submodule as described herein.

In one embodiment, the Compute Controller 420 includes a message queue as provided by message service 426. In accordance with the service-oriented architecture described above, the various functions within the compute service 400 are isolated into discrete internal services that communicate with each other by passing data in a well-defined, shared format, or by coordinating an activity between two or more services. In one embodiment, this is done using a message queue as provided by message service 426. The message service 426 brokers the interactions between the various services inside and outside the Compute Service 400.

In one embodiment, the message service 426 is implemented similarly to the message service described relative to FIGS. 3a-3c. The message service 426 may use the message service 110 directly, with a set of unique exchanges, or may use a similarly configured but separate service.

The Auth Manager 430 provides services for authenticating and managing user, account, role, project, group, quota, and security group information for the compute service 400. In a first embodiment, every call is necessarily associated with an authenticated and authorized entity within the system, and so is or can be checked before any action is taken. In another embodiment, internal messages are assumed to be authorized, but all messages originating from outside the service are suspect. In this embodiment, the Auth Manager checks the keys provided associated with each call received over external API endpoints 412 and terminates and/or logs any call that appears to come from an unauthenticated or unauthorized source. In a third embodiment, the Auth Manager 430 is also used for providing resource-specific information such as security groups, but the internal API calls for that information are assumed to be authorized. External calls are still checked for proper authentication and authorization. Other schemes for authentication and authorization can be implemented by flagging certain API calls as needing verification by the Auth Manager 430, and others as needing no verification.

In one embodiment, external communication to and from the Auth Manager 430 is mediated via one or more authentication and authorization API endpoints 632, provided in a similar fashion to those discussed above. The authentication and authorization API endpoints 432 differ from the external API endpoints 612 in that the authentication and authorization API endpoints 432 are only used for managing users, resources, projects, groups, and rules associated with those entities, such as security groups, RBAC roles, etc. In another embodiment, the authentication and authorization API endpoints 432 are provided as a subset of external API endpoints 412.

In one embodiment, the Auth Manager 430 includes rules processor 434 for processing the rules associated with the different portions of the compute service 400. In one embodiment, this is implemented in a similar fashion to the instruction processor 424 described above.

The Object Store 440 provides redundant, scalable object storage capacity for arbitrary data used by other portions of the compute service 400. At its simplest, the Object Store 440 can be implemented one or more block devices exported over the network. In a second embodiment, the Object Store 440 is implemented as a structured, and possibly distributed data organization system. Examples include relational database systems—both standalone and clustered—as well as non-relational structured data storage systems like MongoDB, Apache Cassandra, or Redis. In a third embodiment, the Object Store 440 is implemented as a redundant, eventually consistent, fully distributed data storage service.

In one embodiment, external communication to and from the Object Store 440 is mediated via one or more object storage API endpoints 442, provided in a similar fashion to those discussed above. In one embodiment, the object storage API endpoints 442 are internal APIs only. In a second embodiment, the Object Store 440 is provided by a separate cloud service 130, so the "internal" API used for compute service 400 is the same as the external API provided by the object storage service itself.

In one embodiment, the Object Store 440 includes an Image Service 444. The Image Service 444 is a lookup and retrieval system for virtual machine images. In one embodiment, various virtual machine images can be associated with a unique project, group, user, or name and stored in the Object Store 440 under an appropriate key. In this fashion multiple different virtual machine image files can be provided and programmatically loaded by the compute service 400.

The Volume Controller 450 coordinates the provision of block devices for use and attachment to virtual machines. In one embodiment, the Volume Controller 450 includes Volume Workers 452. The Volume Workers 452 are implemented as unique virtual machines, processes, or threads of control that interact with one or more backend volume providers 454 to create, update, delete, manage, and attach one or more volumes 456 to a requesting VM.

In a first embodiment, the Volume Controller 450 is implemented using a SAN that provides a sharable, network-exported block device that is available to one or more VMs, using a network block protocol such as iSCSI. In this embodiment, the Volume Workers 452 interact with the SAN to manage and iSCSI storage to manage LVM-based instance volumes, stored on one or more smart disks or independent processing devices that act as volume providers 454 using their embedded storage 456. In a second embodiment, disk volumes 456 are stored in the Object Store 440 as image files under appropriate keys. The Volume Controller 450 interacts with the Object Store 440 to retrieve a disk volume 456 and place it within an appropriate logical container on the same information processing system 440 that contains the requesting VM. An instruction processing module acting in concert with the instruction processor and hypervisor on the information processing system 240 acts as the volume provider 454, managing, mounting, and unmounting the volume 456 on the requesting VM. In a further embodiment, the same volume 456 may be mounted on two or more VMs, and a block-level replication facility may be used to synchronize changes that occur in multiple places. In a third embodiment, the Volume Controller 450 acts as a block-device proxy for the Object Store 440, and directly exports a view of one or more portions of the Object Store 440 as a volume. In this embodiment, the volumes are simply views onto portions of the Object Store 440, and the Volume Workers 454 are part of the internal implementation of the Object Store 440.

In one embodiment, the Network Controller 460 manages the networking resources for VM hosts managed by the compute manager 470. Messages received by Network Controller 460 are interpreted and acted upon to create, update, and manage network resources for compute nodes within the compute service, such as allocating fixed IP addresses, configuring VLANs for projects or groups, or configuring networks for compute nodes.

In one embodiment, the Network Controller 460 may use a shared cloud controller directly, with a set of unique addresses, identifiers, and routing rules, or may use a similarly configured but separate service.

In one embodiment, the Compute Manager 470 manages computing instances for use by API users using the compute service 400. In one embodiment, the Compute Manager 470 is coupled to a plurality of resource pools 472, each of which includes one or more compute nodes 474. Each compute node 474 is a virtual machine management system as described relative to FIG. 3 and includes a compute worker 476, a module working in conjunction with the hypervisor and instruction processor to create, administer, and destroy multiple user- or system-defined logical containers and operating environments—VMs—according to requests received through the API. In various embodiments, the pools of compute nodes may be organized into clusters, such as clusters 476a and 476b. In one embodiment, each resource pool 472 is physically located in one or more data centers in one or more different locations. In another embodiment, resource pools have different physical or software resources, such as different available hardware, higher-throughput network connections, or lower latency to a particular location.

In one embodiment, the Compute Manager 470 allocates VM images to particular compute nodes 474 via a Scheduler 478. The Scheduler 478 is a matching service; requests for the creation of new VM instances come in and the most applicable Compute nodes 474 are selected from the pool of potential candidates. In one embodiment, the Scheduler 478 selects a compute node 474 using a random algorithm. Because the node is chosen randomly, the load on any particular node tends to be non-coupled and the load across all resource pools tends to stay relatively even.

In a second embodiment, a smart scheduler 478 is used. A smart scheduler analyzes the capabilities associated with a particular resource pool 472 and its component services to make informed decisions on where a new instance should be created. When making this decision it consults not only all the Compute nodes across the resource pools 472 until the ideal host is found.

In a third embodiment, a distributed scheduler 478 is used. A distributed scheduler is designed to coordinate the creation of instances across multiple compute services 400. Not only does the distributed scheduler 478 analyze the capabilities associated with the resource pools 472 available to the current compute service 400, it also recursively consults the schedulers of any linked compute services until the ideal host is found.

In one embodiment, either the smart scheduler or the distributed scheduler is implemented using a rules engine 479 (not shown) and a series of associated rules regarding costs and weights associated with desired compute node characteristics. When deciding where to place an Instance, rules engine 479 compares a Weighted Cost for each node. In one embodiment, the Weighting is just the sum of the total Costs. In a second embodiment, a Weighting is calculated using an exponential or polynomial algorithm. In the simplest embodiment, costs are nothing more than integers along a fixed scale, although costs can also be represented by floating point numbers, vectors, or matrices. Costs are computed by looking at the various Capabilities of the available node relative to the specifications of the Instance being requested. The costs are calculated so that a "good" match has lower cost than a "bad" match, where the relative goodness of a match is determined by how closely the available resources match the requested specifications.

In one embodiment, specifications can be hierarchical, and can include both hard and soft constraints. A hard constraint is a constraint is a constraint that cannot be violated and have an acceptable response. This can be implemented by having hard constraints be modeled as infinite-cost requirements. A soft constraint is a constraint that is preferable, but not required. Different soft constraints can have different weights, so that fulfilling one soft constraint may be more cost-effective than another. Further, constraints can take on a range of values, where a good match can be found where the available resource is close, but not identical, to the requested specification. Constraints may also be conditional, such that constraint A is a hard constraint or high-cost constraint if Constraint B is also fulfilled, but can be low-cost if Constraint C is fulfilled.

As implemented in one embodiment, the constraints are implemented as a series of rules with associated cost functions. These rules can be abstract, such as preferring nodes that don't already have an existing instance from the same project or group. Other constraints (hard or soft), may include: a node with available GPU hardware; a node with an available network connection over 100 Mbps; a node that can run Windows instances; a node in a particular geographic location, etc.

When evaluating the cost to place a VM instance on a particular node, the constraints are computed to select the group of possible nodes, and then a weight is computed for each available node and for each requested instance. This allows large requests to have dynamic weighting; if 1000 instances are requested, the consumed resources on each node are "virtually" depleted so the Cost can change accordingly.

Turning now to FIG. 5, a diagram showing one embodiment of the process of instantiating and launching a VM instance is shown as diagram 500. At time 502, the API Server 510 receives a request to create and run an instance with the appropriate arguments. In one embodiment, this is done by using a command-line tool that issues arguments to the API server 510. In a second embodiment, this is done by sending a message to the API Server 510. In one embodiment, the API to create and run the instance includes arguments specifying a resource type, a resource image, and control arguments. A further embodiment includes requester information and is signed and/or encrypted for security and privacy. At time 504, API server 510 accepts the message, examines it for API compliance, and relays a message to Compute Controller 520, including the information needed to service the request. In an embodiment in which user information accompanies the request, either explicitly or implicitly via a signing and/or encrypting key or certificate, the Compute Controller 520 sends a message to Auth Manager 530 to authenticate and authorize the request at time 506 and Auth Manager 530 sends back a response to Compute Controller 520 indicating whether the request is allowable at time 508. If the request is allowable, a message is sent to the Compute Manager 570 to instantiate the requested resource at time 510. At time 512, the Compute Manager selects a Compute Worker 576 and sends a message to the selected Worker to instantiate the requested resource. At time 514, Compute Worker identifies and interacts with Network Controller 560 to get a proper VLAN and IP address. At time 516, the selected Worker 576 interacts with the Object Store 540 and/or the Image Service 544 to locate and retrieve an image corresponding to the requested resource. If requested via the API, or used in an embodiment in which configuration information is included on a mountable volume, the selected Worker interacts with the Volume Controller 550 at time 518 to locate and retrieve a volume for the to-be-instantiated resource. At time 519, the selected Worker 576 uses the available virtualization infrastructure to instantiate the resource, mount any volumes, and perform appropriate configuration. At time 522, selected Worker 556 interacts with Network Controller 560 to configure routing. At time 524, a message is sent back to the Compute Controller 520 via the Compute Manager 550 indicating success and providing necessary operational details relating to the new resource. At time 526, a message is sent back to the API Server 526 with the results of the operation as a whole. At time 599, the API-specified response to the original command is provided from the API Server 510 back to the originally requesting entity. If at any time a requested operation cannot be performed, then an error is returned to the API Server at time 590 and the API-specified response to the original command is provided from the API server at time 592. For example, an error can be returned if a request is not allowable at time 508, if a VLAN cannot be created or an IP allocated at time 514, if an image cannot be found or transferred at time 516, etc. Such errors may be one potential source of mistakes or inconsistencies in periodic system status notifications discussed below.

Having described an example of a distributed application and operation within a distributed network system, various embodiments of methods and systems for verification of records of system change events in a distributed network system are described with references to FIGS. 6-10. As used herein, a distributed network system may relate to one or more services and components, and in particular cloud services. Various embodiments of the methods and systems disclosed herein may permit verification of records of system change events in a distributed network system providing cloud services.

Figure 6:
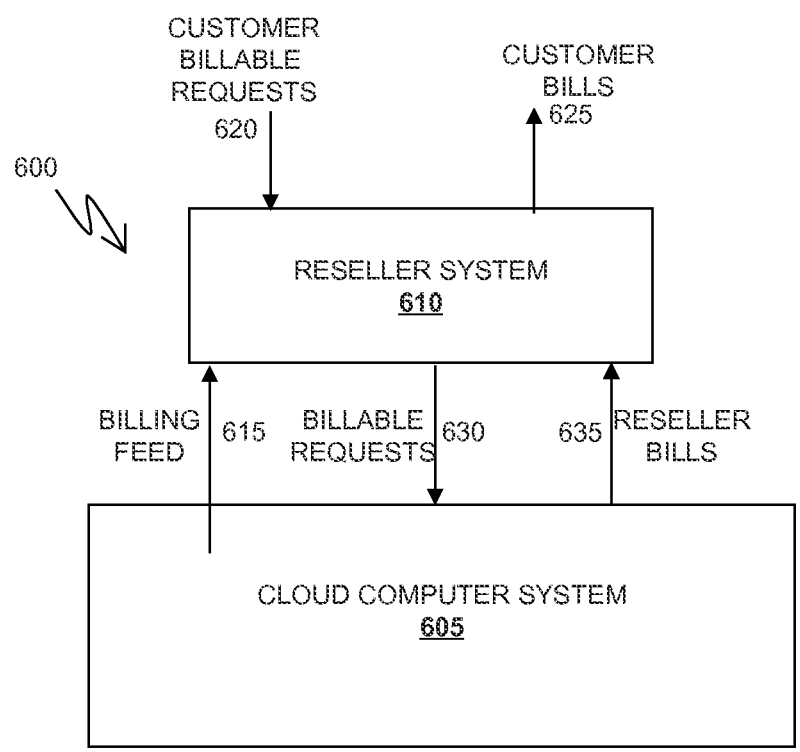
FIG. 6 illustrates a graphical representation of a system for reselling resources of a distributed network system.

FIG. 6 illustrates a simplified diagram of a system for reselling resources of a distributed network system, and in particular a cloud computing system. System 600 includes cloud computing system 605 (e.g., cloud computing system 130) and a reseller system 610. According to one embodiment, cloud computer system 605 may provide cloud services to reseller system 610 and a billing feed 615. Billing feed 615 may include one or more potential billable elements for tracking usage. Billing feed 615 may provide data based on one or more models for tracking and billing usage.

Reselling system 610 may be configured as an intermediary for selling and/or providing services of cloud computing system 605 to one or more entities, such as customers. Services by reseller system 610 may be based on requests, such as customer billable request 620. Based on received requests for cloud services, reseller system may generate one or more customer bills 625. Similarly, reseller system may generate one or more requests, such as billable requests 630 for cloud services. Based on requested services buy reseller system 610, cloud computing system 605 may generate one or more reseller bills 635. According to one embodiment, customer bills 625 generated by reseller system 610 may be based on one or more of billing feed 615 and service fees, such as reseller bills 635.

In a further embodiment, reseller system 610 may request failure reports or error-related data in addition to billing feed 615 in order to verify compliance with Service Level Agreements (SLAs) between reseller and cloud computing service provider, or between reseller and reseller's customers.

Figure 7:
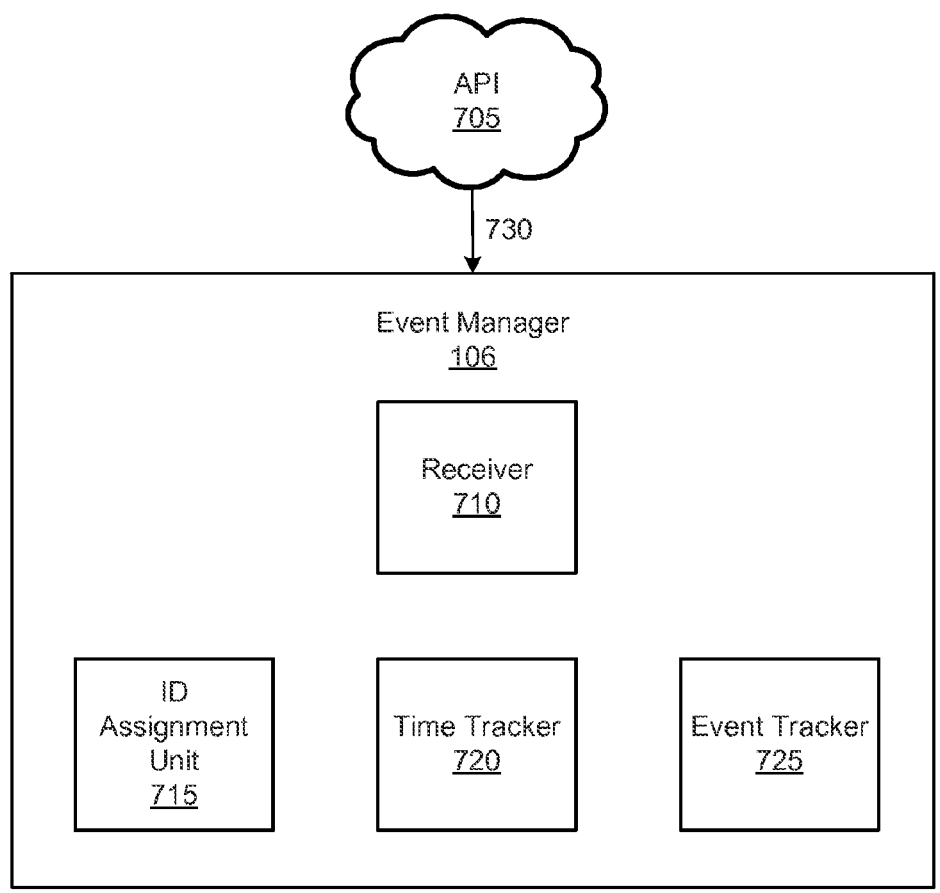
FIG. 7 is a schematic block diagram illustrating one embodiment of an apparatus for monitoring failures in a distributed network system.

FIG. 7 illustrates one embodiment of an event manager 106. Event manager 106 may include a receiver 710 coupled to an API 705 which is configured to receive API requests from, e.g., system users. In an alternative or further embodiment, receiver 710 may be coupled to message service 110 and configured to observe system messages responsive to API requests 730 received by API 705. In certain embodiments, receiver 710 may be integrated with or replaced by API 705, depending upon the system configuration.

Event manager 106 may further comprise an ID Assignment Unit 705 which is configured to assign a unique identifier (ID) to each API request 730 received by API 705. The unique ID may be used for tracking subsequent actions, events, or results of the API request 730, including a final API request disposition.

Event manager 106 may also include a time tracker 720 configured to record a time at which the API request 730 was received by API 705 in association with the unique ID. Time tracker may use a time stamp which is included with the API request 730, a timestamp assigned by the API 705 at the time the API request 730 is received, a timestamp associated with an internal system clock in response to the receiver 710 receiving the API request 730 or an associated message, or the like. In a further embodiment, the time tracker 720 may include a counter. In an embodiment, the time tracker 720 starts the counter at the time the receiver 710 receives the API request 730. One of ordinary skill may recognize alternative, but suitable methods which may be employed by time tracker 720 to track timing of events associated with the API request 730.

Event manager 106 may further include an event tracker 725. Event tracker 725 may be configured to update a record indexed by the unique identifier in response to receipt of notifications for events associated with the API request 730. For example, event tracker 725 may record process or operation start times, operation errors and time of error, operation terminations, and the like. Event tracker 725 may be further configured to record a final disposition of the API request 730. For example, the final disposition may be "Request Complete," "Operation Successful," "API 5XX Response," "Server-Side Failure," "Time Threshold Failure," or "Error State Failure," etc. On of ordinary skill in the art may recognize additional final disposition labels which may be of use for calculating or recording system failure rates.

In a preferred embodiment, the timing of each event is calculated with reference to the time at which the API request 730 is received or transmitted by the user, rather than the time at which a responsive process starts. Beneficially, this approach may yield failure monitoring results that are more realistic and more closely tied to the user's actual experience.

In a further embodiment, the time threshold failure may be triggered in response to a determination that a runtime duration between receipt of the API request 730 and termination of a responsive process exceeded a predetermined time threshold, regardless of whether the operation successfully completed. Beneficially, the time threshold failure may track a user's experience, and may reflect a failure in failure reports for processes that take so long to complete that the user would consider the operation to have failed regardless of the actual result.

The timing threshold may be predetermined in response to analysis of user's expectations. Alternatively, an arbitrary threshold may be selected. In still other embodiments, a first threshold may be set for completion of a first operation or category of operations, and a second time threshold may be set for completion of a second operation or category of operations. In still a further embodiment, the timing threshold may be dynamically updated in response to observations of average operation completion times. For example, if event manager 106 determines that a particular operation takes one hour to complete on average, the time threshold may be set to one hour plus a reasonable margin. In certain embodiments, the event manager may update the timing thresholds dynamically and automatically for one or more operations associated with one or more common API requests 730.

The event tracker 725 may also be configured to calculate an error rate associated with one or more API requests 730 tracked by event tracker 725. For example, event tracker 725 may query a set of records to determine a total number of API requests received in a certain time period. For example, the time period could be one hour, one day, one week, two weeks, one month, one quarter, one year, or any other specified time period. In a further embodiment, the time period may be selectable by a user or specified in a report request.

The event tracker 725 may be configured to aggregate information from the API request 730 records generated within the time period and generate a report listing, for example, a total number of failures occurring within a specified category. For example, the specified categories may include "API 5XX Response," "Server-Side Failure," "Time Threshold Failure," or "Error State Failure," etc. In a further embodiment, the event tracker 725 may be configured to calculate a total number of failures and a failure rate. According to one embodiment, the failure rate may be calculated in response to equation 1:

$$FR = 1 - \frac{API\ Req. - API\ 5XX\ Resp. - ServerSide\ \text{Failures} - \text{Time Threshold Failures} - \text{Error State Failures}}{API\ Req.}, \quad (1)$$

where FR is the failure rate, API Req. is the total number of API requests 730 received during the time period, API 5XX Resp. is the total number of 5XX responses issued in response to API requests, ServerSide Failures is the total number of 5XX API failures or other Server-Side failures that occurred within the time period, Time Threshold Failures is the total number of operations that exceeded the operation time threshold, regardless of result, and Error State Failures are the total number of operations that ended in a failure state even if a Server-Side Failure was not involved. Error state failures may occur as a result of downstream 4XX failures, or other operation runtime errors.

Figure 8:
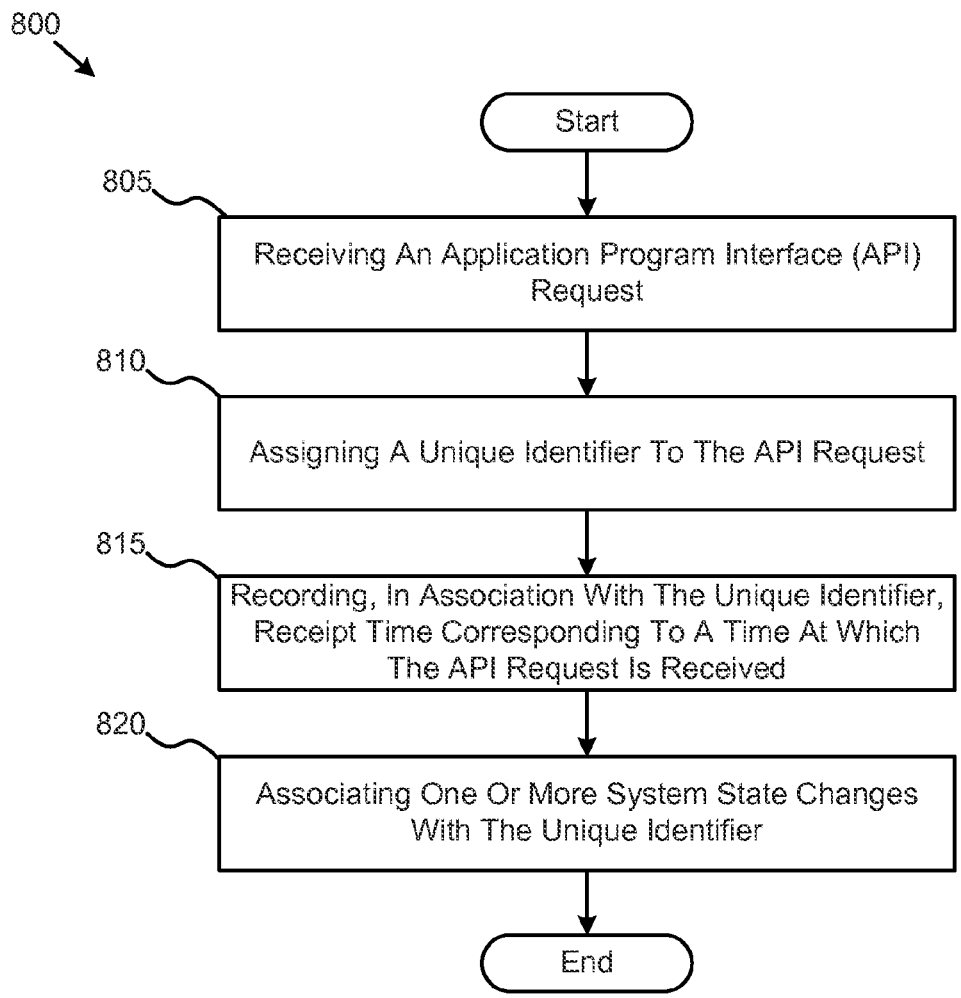
FIG. 8 is a flowchart diagram illustrating one embodiment of a method for monitoring failures in a distributed network system.

FIG. 8 illustrates one embodiment of a method 800 for failure monitoring. In one embodiment the method 800 starts when receiver 710 receives an API request 730 from API 705 as shown in block 805. In an alternative embodiment, receiver 710 may receive a system message from message service 110 associated with receipt of API request 730.

The ID assignment unit 715 may then assign a unique ID to the API request 730 as shown at block 810. The unique ID may be used to track further events associated with the API request 730. Additionally, the time tracker 720 may record a time at which the API request 730 was received at API 705 as shown at block 815. In an alternative embodiment, time tracker 720 may record a time at which receiver 710 receives API request 730 or a message from message service 110 associated with receipt of API request 730. As shown at block 820, event tracker 725 may then associate one or more system state changes with the unique identifier, where the system state changes are in response to the API request 730. In one embodiment, the recorded system state changes may be included in an API request record as illustrated in FIG. 9.

The embodiment of an API request record 900 of FIG. 9 may include an API request ID field 905. Additionally, the record 900 may include a timestamp field for recording a time at which the API request 730 is received. The record 900 may also include one or more additional entries 910-935 associated with system state changes that occur in response to API request 730. The system state changes may be identified by receiver 710 by messages communicated from message service 110. Record 900 may also include a final disposition field for recording a final disposition of the API request 730.

FIG. 9 illustrates an example record. In this example, unique identifier #6789 is assigned to API request 730 and used for tracking subsequent system events associated with API request 730. The record 900 also indicates that API 705 received API request 730 at 10:00 AM. Response field 915 shows the initial HTTP response code issued. In this embodiment, API 705 issued an HTTP code 202 response indicating that the API request 730 was accepted. The 202 response was issued at 10:01 AM. Process start filed 920 indicates that process XYZ was started at 10:05 in response to API request 730. Process error field 925 indicates that process XYZ experienced a runtime error at 10:15 AM. In this example, the runtime error code is #4321. Process restart field 930 indicates that process XYZ was restarted at 10:20 AM and ran until 11:25 AM at which time process XYZ completed successfully as indicated by process completion field 935. One of ordinary skill in the art will recognize that the fields 915-935 are only examples of fields or entries which may be included in record 900, and are only illustrated by way of a non-limiting example for demonstrative purposes only.

Final disposition field 940 indicates that there was a time threshold failure in this example. Despite the fact that process XYZ completed successfully, the final disposition is listed as a failure because the total runtime exceeded a one hour threshold by twenty five minutes. In this embodiment, the runtime was calculated from the time the API request 730 was received—10:00 AM in this example, until process XYZ completed.

In one embodiment, only a single failure—time threshold exceeded failure—is recorded for the API request, despite the fact that there was an additional error code #4321 recorded. Use of a final disposition indicator ensures that only a single failure is recorded for each API request 730. One of ordinary skill in the art may recognize alternative approaches for associating only a single failure to a given API request 730, even though multiple system failures may occur as a result of the API request 730.

Figure 10:
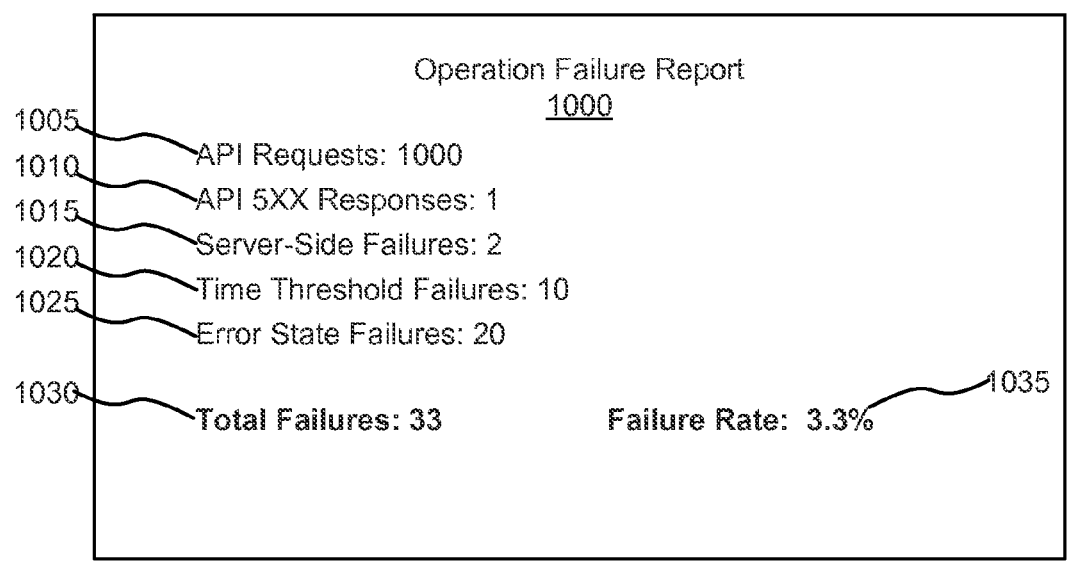
FIG. 10 illustrates one embodiment of an operation failure report.

FIG. 10 illustrates one embodiment of an operation failure report 1000 that may be generated according to the present embodiments. In the described embodiment, the operation failure report includes several fields or entries 1005-1035. For example, the report 1000 may include an API request count field 1005 for reporting a total number of API requests received during a specified time period. The report 1000 may also include an API 5XX response field 1010, an API Server-Side Failure field 1015, a time threshold failures filed 1020, and an error state failures field 1035 for providing counts of each respective type of failure. In a further embodiment, the report 1000 may include a total failures field 1030 for aggregating the total number of failures. Also, the report 1000 may include a failure rate field 1035 for providing an overall failure rate.

In this example, the report 1000 indicates that API 705 received 1000 API requests in the specified time period, and that 33 total failures occurred in response to the 1000 API requests. The failures included one API 5XX response, two API Server-Side Failures, ten time threshold failures and twenty error state failures. Calculating the failure rate according to Equation 1, the total failure rate is 3.3%. One of ordinary skill in the art will recognize that the figures described in this example are merely for demonstration purposes, and in no way reflect actual failure rates or customer data.

In one embodiment, failure monitoring is implemented as an electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor, running as a discrete operating environment, as a process in an active operating environment, or can be run from a low-power embedded processor. In a second embodiment, the instruction processor takes the form of a series of interoperating but discrete components, some or all of which may be implemented as software programs. In another embodiment, the instruction processor is a discrete component, using a small amount of flash and a low power processor, such as a low-power ARM processor. In a further embodiment, the instruction processor includes a rule engine as a submodule as described herein.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for failure monitoring in a distributed network system providing cloud services, the method comprising:
   receiving an Application Programming Interface (API) request issued by a requestor, the API request specifying a task for processing by the distributed network system;
   assigning a unique identifier to the API request;
   updating the API request to reflect the unique identifier;
   recording, in association with the unique identifier, a request time corresponding to a time at which the API request was transmitted by the requestor;
   during the processing of the API request by a plurality of communicatively coupled service-providing computing devices:
   at each one of the coupled computing devices, tracking events associated with the API request, and reporting tracked events to an aggregation process;
   at the aggregation process, tracking the progress of the request through the coupled computing devices by aggregating responses using the unique identifier of the associated API request, and wherein the tracked events each indicate progress or failure in the completion of the API request by the system;
   determining, based on the tracked events, one or more state changes in the distributed network system, the state changes corresponding to both the transit of the request through the coupled computing devices and side effects that may occur in response to the API request;
   associating the one or more state changes with the unique identifier assigned to the API request;

determining a final disposition of the API request based on the determined state changes associated with the API request and the recorded request time, and recording the final disposition of the API request in a final disposition field associated with the unique identifier, wherein the value of the final disposition field is separate from the failure or success of the system in processing the API request; and
writing the tracked events and state changes to a log.

2. The method of claim 1, wherein the one or more state changes include the detection of an initialization indicator signaling an operation to satisfy the API request has started.

3. The method of claim 1, wherein the one or more state changes include the detection of an error indicator signaling that an error occurred during an operation to satisfy the API request.

4. The method of claim 1, wherein the one or more state changes include the detection of a termination indicator signaling that an operation to satisfy the API request has ended.

5. The method of claim 1, further comprising:
calculating an operation runtime value with reference to a time at which the API request was received.

6. The method of claim 5, wherein calculating the operation runtime further comprises:
determining a termination time corresponding to a time at which an operation to satisfy the API request has terminated; and
determining the elapsed time between the receipt time and the termination time.

7. The method of claim 6, wherein the termination time corresponds to a time at which at least one of a termination indicator or an error indicator is received.

8. The method of claim 6, recording a time threshold failure, in association with the unique identifier, in response to a determination that the runtime exceeds a predetermined threshold.

9. The method of claim 8, further comprising calculating a failure rate in response to a quantification of API requests, API 5XX responses, Server-Side Failures, time threshold failures, and error state failures.

10. The method of claim 1, further comprising:
determining based on the disposition field for a plurality of API requests, an overall time threshold failure rate for different categories of API requests.

11. A system for providing failure monitoring in a distributed network system, comprising:
a plurality of communicatively coupled processing devices, each processing device including a processor and a memory coupled to the processor, the memory including computer-readable instructions executable by the processor;
wherein a first coupled processing device includes instructions that cause the system to provide:
an Application Program Interface (API) configured to receive requests transmitted by a requester;
and an event manager component configured to:
receive the API request, the API request specifying a task for processing by the distributed network system;
assign a unique identifier to the AP request;
record, in association with the unique identifier, a request time at which the API request was transmitted by the requester, and
modify the API request to reflect the unique identifier;
wherein one coupled processing device includes instructions that cause the system to provide:
an event aggregator configured to;
track events associated with the API request, wherein the events are tracked using the unique identifier of the associated API request, and wherein the tracked events each indicate progress or failure in the completion of the API request by the system;
determine, based on the tracked events, one or more state changes associated with the API request, said state changes corresponding to both the transit of the request through the coupled processing devices and side effects that may occur; and
associate the one or more state changes across multiple devices by aggregating them using the unique identifier assigned to the API request;
determine a final disposition of the API request based on the determined state changes associated with the API request and the recorded request time; and
record the final disposition of the API request in a final disposition field associated with the unique identifier, wherein the value of the final disposition field is separate from the failure or success of the system in processing the API request.

12. The distributed network system of claim 11, wherein the one or more state changes include the detection of an initialization indicator signaling an operation to satisfy the API request has started.

13. The distributed network system of claim 11, wherein the one or more state changes include the detection of an error indicator signaling that an error occurred during an operation to satisfy the API request.

14. The distributed network system of claim 11, wherein the one or more state changes include the detection of an termination indicator signaling that an operation to satisfy the API request has ended.

15. The distributed network system of claim 11, wherein the event manager is further configured to calculate an operation runtime value with reference to a time at which the API request was received.

16. The distributed network system of claim 15, wherein calculating the operation runtime further comprises:
determining a termination time corresponding to a time at which an operation to satisfy the API request has terminated; and
determining the elapsed time between the receipt time and the termination time.

17. The distributed network system of claim 16, wherein the termination time corresponds to a time at which at least one of a termination indicator or an error indicator is received.

18. The distributed network system of claim 16, wherein the event manager is further configured to record a time threshold failure, in association with the unique identifier, in response to a determination that the runtime exceeds a predetermined threshold.

19. The distributed network system of claim 18, wherein the event manager is further configured to calculate a failure rate in response to a quantification of API requests, API 5XX responses, Server-Side Failures, time threshold failures, and error state failures.

20. A non-transitory computer-accessible storage medium storing program instructions that, when executed by a data processing device, cause the data processing device to implement operations for failure monitoring in a distributed network system providing cloud services, the operations comprising instructions for:

receiving an Application Program Interface (API) request transmitted by a requestor, the API request specifying a task for processing by the distributed network system;

assigning a unique identifier to the API request;

modifying the request to include the unique identifier;

recording, hi association with the unique identifier, a request time corresponding to a time at which the API request was transmitted by a requestor;

receiving from a plurality of communicatively coupled systems event reports, where such event reports include both reports of the transit of the request through a system and possible state changes associated with the processing of the request by the system;

associating the one or more state changes with the unique identifier assigned to the API request, to both the transit of the request through the coupled computing devices and side effects that may occur in one or more communicatively coupled systems;

determining a final disposition of the API request based on the determined state changes associated with the API request and the request time and recording the final disposition of the API request in a final disposition field associated with the unique identifier, wherein the value of the final disposition field is separate from the failure or success of the system in processing the API request.

* * * * *